(12) United States Patent
Harper et al.

(10) Patent No.: US 10,558,859 B2
(45) Date of Patent: *Feb. 11, 2020

(54) AUGMENTED REALITY INSTALLATION/TROUBLESHOOTING ASSISTANCE

(71) Applicant: DISH Technologies L.L.C., Englewood, CO (US)

(72) Inventors: Leslie Ann Harper, Highlands Ranch, CO (US); John Card, II, Denver, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,290

(22) Filed: Nov. 14, 2018

(65) Prior Publication Data

US 2019/0080174 A1 Mar. 14, 2019

Related U.S. Application Data

(63) Continuation of application No. 16/025,817, filed on Jul. 2, 2018, now Pat. No. 10,163,012, which is a (Continued)

(51) Int. Cl.
| | |
|---|---|
| *G06K 9/00* | (2006.01) |
| *H04N 17/04* | (2006.01) |
| *G06T 11/60* | (2006.01) |
| *H04N 5/232* | (2006.01) |
| *H04N 17/00* | (2006.01) |

(Continued)

(52) U.S. Cl.
CPC ........ *G06K 9/00671* (2013.01); *G06K 9/228* (2013.01); *G06K 9/6202* (2013.01); *G06T 11/60* (2013.01); *H04N 5/23222* (2013.01); *H04N 17/004* (2013.01); *H04N 17/04* (2013.01); *H04N 21/4223* (2013.01); *H04N 21/4425* (2013.01)

(58) Field of Classification Search
CPC ...... G06K 9/00; G06K 9/00671; G06K 9/228; G06K 9/22
See application file for complete search history.

(56) References Cited

U.S. PATENT DOCUMENTS 7,295,882 B2 11/2007 Champion et al.
8,018,492 B2 * 9/2011 Musunuri ............ H04N 17/004
348/192

(Continued)

FOREIGN PATENT DOCUMENTS

EP 2 942 693 A1 11/2015

*Primary Examiner* — Anand P Bhatnagar
(74) *Attorney, Agent, or Firm* — Seed IP Law Group LLP

(57) ABSTRACT

Embodiments are directed toward analyzing images of cables or electronic devices to augment those images with information relating to the installation or troubleshooting of such cables and electronic devices. The images are analyzed to determine non-text characteristics of a connector of the cable or non-text characteristics of at least one port on the electronic device. These non-text characteristics can be compared with non-text characteristics of known connectors or ports to determine a type of the connector or a type of the ports on the electronic device. The images are then modified or overlaid with information identifying the type of connector or port.

20 Claims, 15 Drawing Sheets

Related U.S. Application Data continuation of application No. 15/445,850, filed on Feb. 28, 2017, now Pat. No. 10,049,276.

(51) Int. Cl.
*H04N 21/4223* (2011.01)
*H04N 21/4425* (2011.01)
*G06K 9/22* (2006.01)
*G06K 9/62* (2006.01)

(56) References Cited

U.S. PATENT DOCUMENTS

| | | | |
|---|---|---|---|
| 8,384,522 B2 * | 2/2013 | Macauley | G01S 5/14 340/10.1 |
| 8,606,657 B2 | 12/2013 | Chesnut et al. | |
| 9,235,824 B2 * | 1/2016 | Martin | G06Q 10/087 |
| 9,336,541 B2 | 5/2016 | Pugazhendhi et al. | |
| 9,355,393 B2 * | 5/2016 | Purves | G06Q 20/105 |
| 9,355,452 B2 | 5/2016 | Sugden | |
| 9,870,773 B2 * | 1/2018 | German | G06F 16/5854 |
| 2008/0129826 A1 * | 6/2008 | Musunuri | H04N 17/004 348/192 |
| 2010/0052856 A1 * | 3/2010 | Macauley | G01S 5/14 340/10.1 |
| 2012/0197582 A1 * | 8/2012 | Richardson | G06F 11/2294 702/122 |
| 2013/0246261 A1 * | 9/2013 | Purves | G06Q 20/105 705/41 |
| 2016/0132532 A1 * | 5/2016 | German | G06F 16/5854 382/103 |
| 2016/0379192 A1 * | 12/2016 | Purves | G06Q 20/105 705/41 |
| 2017/0018274 A1 * | 1/2017 | German | G06F 16/5854 |
| 2019/0080174 A1 * | 3/2019 | Harper | G06K 9/00671 |

* cited by examiner

AUGMENTED REALITY INSTALLATION/TROUBLESHOOTING ASSISTANCE

TECHNICAL FIELD

The present disclosure relates generally to augmented reality, and more particularly, but not exclusively, to enhanced installation and troubleshooting of audio/visual equipment.

BACKGROUND

Description of the Related Art

It is now commonplace for the everyday household to have one or more home theater systems. These systems can be as basic as a single television with built-in speakers or as complicated as a multi-component system with numerous-channel surround sound. These systems often include many different audio/visual devices, such as a television, a set-top box, an audio receiver, DVD/Blu-ray players, external digital video recorder (DVR) devices, external speakers, and other audio/visual devices. In many instances, these devices are communicatively coupled to one another via a series of wires. Although some devices can now communicate via wireless data signals, the vast majority of devices in homes today still rely on wired connections. As the number of components in a home theater system increases, so too does the number of wires connecting the various different devices. It can be difficult, however, to determine which wires are needed for each device and how to properly connect the wires to the devices. This problem can be accentuated when new wire connectors, ports, and adaptors are introduced. It is with respect to these and other considerations that the embodiments herein have been made.

BRIEF SUMMARY

Briefly described, embodiments are directed toward systems and methods of presenting an augmented reality for electronic device installation and troubleshooting. A mobile computing device captures images of an electronics cable and an electronic device. The images of the cable are analyzed to determine non-text characteristics of a connector of the cable. Similarly, the images of the electronic device are analyzed to determine non-text characteristics of at least one port on the electronic device. In some embodiments, these non-text characteristics can be compared to each other to determine if the connector is compatible with one of the ports on the electronic device. In other embodiments, these non-text characteristics can be compared with non-text characteristics of known connectors and ports to determine a type of the connector and a type of the ports on the electronic device. The system can then determine if the cable connector and electronic device ports are compatible based on a comparison of the type of cable connector and the type of ports.

The images captured by the mobile computing device can be modified or overlaid with information identifying the type of cable connector, the type of port, their compatibility or lack thereof, or instructions regarding into which port to plug the connector. These modified images can then be displayed to the user in near real time, or "live," which present the user with an augmented reality of the identification, installation, or troubleshooting of cables and electronic devices.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
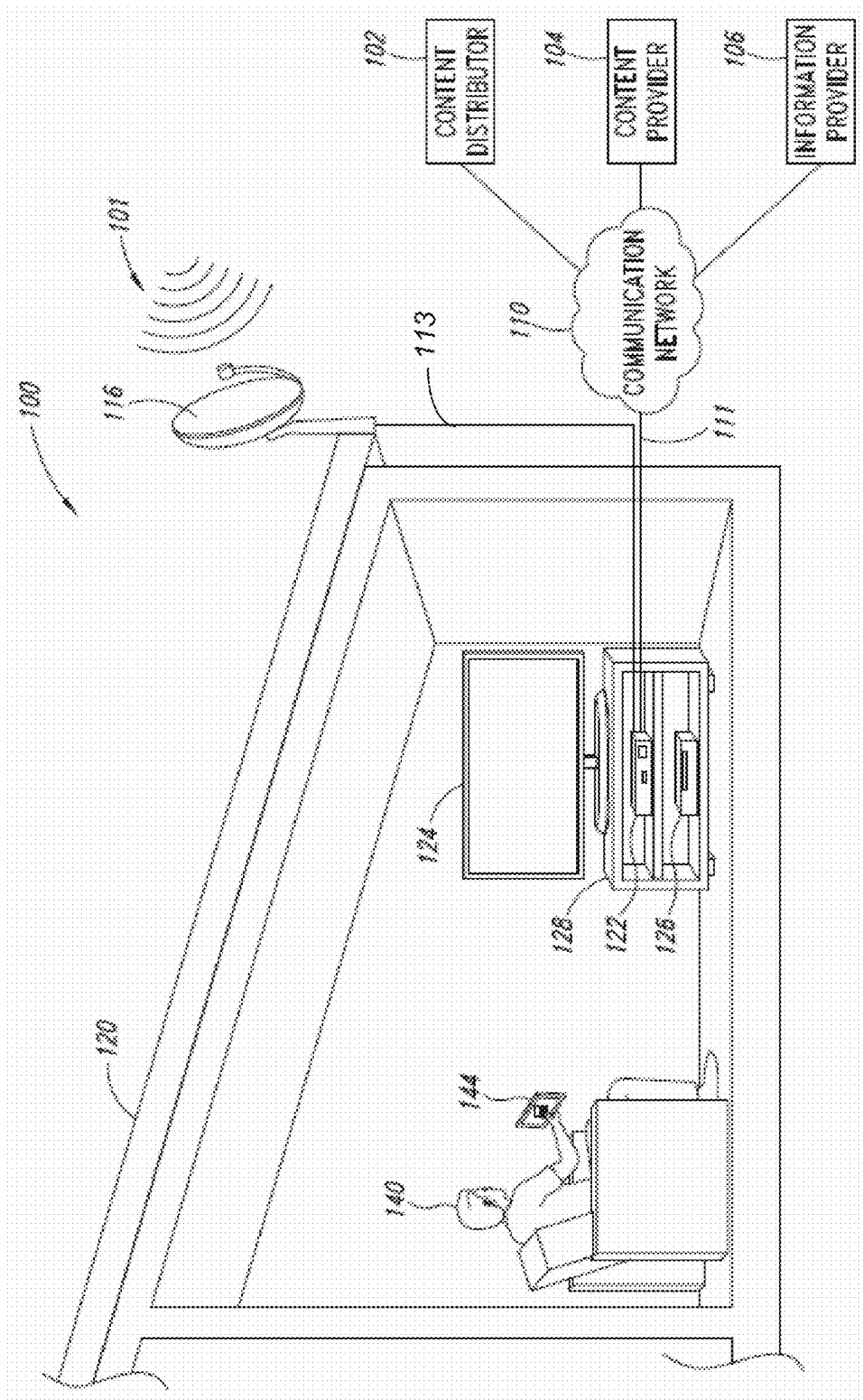
FIG. 1 illustrates a context diagram of an example environment of a user utilizing a mobile computing device for augmented reality installation and troubleshooting assistance in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to "input/output port" or "port" refer to a port for receiving or sending electronic signals, which may include electronic data signals, electronic power signals, or other electrical signals. An input/output port may be an input port, an output port, or a combination input and output port, unless the context clearly dictates otherwise. Examples of input/output ports may include, but are not limited to, HDMI output ports, HDMI input ports, bi-directional HDMI ports, USB ports, RCA video or audio input ports, RCA video or audio output ports, power cable ports, coaxial cable ports, or other input or output ports.

References herein to an "electronic device" refer to a device that includes one or more input/output ports. Examples of electronic devices may include, but are not limited to, televisions, set-top boxes, audio receivers, DVD/Blu-ray players, external digital video recorder (DVR) devices, external speakers, gaming consoles, laptop or desktop computers, smart phones, POTs telephones, modems, routers, or other electronic devices that have input/output ports.

FIG. 1 illustrates a context diagram of an example environment of a user utilizing a mobile computing device for augmented reality installation and troubleshooting assistance in accordance with embodiments described herein. Example 100 includes content provider 104, information provider 106, content distributor 102, communication networks 110, and user premises 120.

In general, the user's premises 120 includes an entertainment system 128 and a user 140. The entertainment system 128 includes a display device 124, a television receiver 122, and a peripheral device 126. Details of these components and systems are described in more detail below. But a brief description of how the user 140 can utilize a mobile computing device 144 for augmented reality installation and troubleshooting assistance is now provided. The mobile computing device 144 can be any portable electronic device with a camera and CPU that are in the same housing, which may include a smartphone, a smart watch, portable laptop computer, tablet, or other similar devices.

In one example scenario the user 140 may want to add a new television receiver 122 into their entertainment system 128. The user 140 can position the new television receiver 122 into the entertainment system 128 or the user 140 can place it on the floor or on a table. There will usually be one or more cables or wired connections that extend between the television receiver 122, the display device 124 and one or more peripheral devices 126, however, these are not shown in FIG. 1 for ease of illustration. Their use and locations will be explained in subsequent figures. To receive instructions on how to install the television receiver 122, the user 140 accesses an application or program executing on the mobile computing device 144. This application includes tutorials, instructions, or other information on how to connect the new television receiver 122 to other electronic devices, such as the display device 124 or other peripheral devices 126. Similarly, the application on the mobile computing device 144 may also include troubleshooting information for assessing and fixing various issues that can arise during or after the installation process.

As described in more detail below in conjunction with FIG. 2 and elsewhere herein, the mobile computing device 144 instructs the user to take an image, or video, of the new television receiver 122 and any cables that the user already has or that came with the new television receiver 122. In some embodiments, the mobile computing device 144 may display "live" video captured by a camera on the mobile computing device 144. As the user is viewing this "live" video, the mobile computing device 144 identifies the types of cables or cable connectors that the user has access to, as well as the ports on the television receiver 122. The mobile computing device 144 then modifies the captured images to provide additional instructions to the user 140, such as circling or highlighting the particular cables or ports on the television receiver 122 that are compatible with one another.

Since the mobile computing device 144 can provide step-by-step instructions to the user 140, the mobile computing device 144 can walk the user through the installation process and indicate which cables are used to connect which electronic devices, and which ports on those electronic devices are compatible with the user's cables. For example, the user can take images of the cables so that the mobile computing device 144 can identify which types of cables and connectors the user has available, such as an HDMI cable.

The mobile computing device 144 can then instruct the user to take an image of the back of the television receiver 122 where the input/output ports are located. From this image, the mobile computing device 144 can identify, for example, an HDMI output port that is compatible with the user's HDMI cable. The mobile computing device 144 can modify or augment the image to indicate which port on the back of the television receiver 122 is the correct HDMI output port and that the user should plug in an appropriate connector of the HDMI cable into that port.

The mobile computing device 144 can then instruct the user to take pictures of the entertainment system 128, from which it can identify the display device 124 and modify the image to indicate which device is the display device 124. Although this example may seem intuitive, some people may not know the difference between a DVR device and a Blu-ray player, or they may not know whether the Blu-ray player is output to the DVR device, which is then output to the television, or vice versa, or some other input/output sequence between multiple electronic devices.

The mobile computing device 144 can then instruct the user to take an image of the side or back of the display device 124, depending on the location of the ports on the display device 124. From this image, the mobile computing device 144 can determine which port is compatible with the HDMI cable being output from the television receiver 122, such as an HDMI input port. Again, the mobile computing device 144 can modify the image to indicate the appropriate port for the user to plug in the HDMI cable.

Although the above example describes the mobile computing device 144 as instructing the user to take multiple images, the mobile computing device 144 may also be displaying "live" video from the camera on the mobile computing device 144, and may instruct the user to point the camera at the various electronic devices and cables from which the system can utilize one or more image frames of the video to do its analysis and augmentation.

Moreover, in some situations, some images may be too blurry to accurately identify the input/output ports or the cable connectors. Accordingly, the mobile computing device 144 can instruct the user, via visible or audible commands, to move the mobile computing device 144 or to turn, rotate, or otherwise reposition the electronic device, cables, camera, or mobile computing device to obtain better images.

Similarly, in some situations, there may not be enough light to identify the non-text characteristics of the cable connectors or electronic device ports in the image. Accordingly, the mobile computing device can instruct the user to shine additional light on the cable or electronic device, such as by turning on a room light, a flashlight, or the light associated with the camera on the mobile computing device. In some other embodiments, the mobile computing device may instruct the user to manually adjust a zoom, focus, color, or other imaging property or parameter of the camera on the mobile computing device to obtain better images.

In addition to instructing the user to perform some action in an attempt to obtain better images, the mobile computing device can perform automatic operations in an attempt to make the images better suited for identifying the cable connectors or electronic device ports. For example, in some embodiments, the mobile computing device can automatically turn on the light associated with the camera. This light may be a flash, such as for still frame images, or it may turn the light on for a longer duration so that the mobile computing device can identify the cable connectors or electronic device ports and appropriately augment the images in near real time, as described herein, while maintaining additional light on the cables or electronic devices.

In other embodiments, the mobile computing device may automatically adjust an imaging property or parameter of the camera on the mobile computing device. For example, the mobile computing device can automatically adjust an optical or digital zoom of the camera on the mobile computing device. Automatically adjusting the zoom enables the mobile computing device to capture additional images with different magnifications of the cables or electronic devices, which can provide images that with more distinct or defined non-text characteristics of the cable connectors or electronic device ports. In other embodiments, the mobile computing device may modify the focus, color, or other imaging properties and parameters to improve the quality of the images for identifying non-text characteristics of the cable connectors and electronic device ports.

These manual or automatic adjustments, alone or in combination, can improve the image quality for locating non-text characteristics of the cable connectors or electronic device ports. Similarly, these images and commands can be utilized to instruct the user where to find other information associated with the electronic device.

For example, assume the user needs to know the model number of the electronic device, such as for registering the electronic device with the manufacturer. The user can use the camera on the mobile computing device to take images of the electronic device. These images are utilized to identify a side of the electronic device that is facing the camera. The images can then be augmented with commands, or the mobile computing device can provide audible commands, to instruct the user to turn the electronic device to the correct side that includes the model number of the electronic device. As the user is turning the electronic device, the mobile computing device can continue to capture images and instruct the user to keep turning the electronic device until the model number is visible. At this point, the images can be augmented with arrows, circles, or other text, graphics, or symbols to show in real time where the model number is located on the electronic device. This augmented reality and instructions can guide a user to find information on the electronic devices, buttons, displays, ports, or other features or components of the electronic device.

The techniques described herein can be applied to troubleshooting after the user has connected and installed the cables and electronic devices. For example, the mobile computing device 144 can instruct the user to take images of the various electronic devices, their ports, and the cables connecting them. From these images, and by employing embodiments described herein, the mobile computing device 144 can identify if any of the cables are incompatible with the current port it is plugged into; plugged into an incorrect port, such as an input port rather than an output port; or plugged into an incorrect electronic device.

The display device 124 may be a television, monitor, projector, or other display device. The peripheral device 126 includes one or more other electronic devices, such as, but not limited to, a DVD player, a VCR, a Blu-ray player, a stereo, an audio receiver, speakers, a game console, a stand-alone DVR device, or other electronic devices.

The television receiver 122 is a computing device that receives content from a content distributor 102 and provides it to the display device 124 for presentation to the user 140. Examples of television receiver 122 may include, but are not limited to, a set-top box, a cable connection box, a computer, or other content or television receivers. The television receiver 122 can be configured to receive the content from the content distributor 102 via wired connection 111, or satellite antenna 116 via wired connection 113. For example, in some embodiments, the content distributor 102 may provide the content and data to a user's television receiver 122 directly through communication network 110 via wired connection 111. In other embodiments, the content may be sent through an uplink (not illustrated), which goes to a satellite (not illustrated) and back to the satellite antenna 116 via satellite media signals 101.

Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

The content distributor 102 receives the content from content providers 104. Briefly, content providers 104 generate, aggregate, and/or otherwise provide audiovisual content that is provided to one or more users. Sometimes, content providers are referred to as "channels." Examples, of content providers 104 may include, but are not limited to, film studios; television studios; network broadcasting companies; independent content producers, such as AMC, HBO, Showtime, or the like; or other entities that provide content for user consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, or the like. In this context, program content may also include commercials or other television advertisements. It should be noted that the commercials may be added to the program content by the content providers 104 or the content distributor 102.

The content distributor 102 may also receive other information or data, such as from information provider 106. The Information provider 106 may create and distribute data or other information that describes or supports audiovisual content. Generally, this data is related to the program content provided by content provider 104. For example, this data may include metadata, program name, closed-caption authoring and placement within the program content, timeslot data, pay-per-view and related data, or other information that is associated with the program content. In some embodiments, the content distributor 102 combines or otherwise associates the data from the information provider 106 and the program content from the content provider 104, which may be referred to as the distributed content or more generally as content. However, other entities may also combine or otherwise associate the program content and other data together.

Figure 2A:
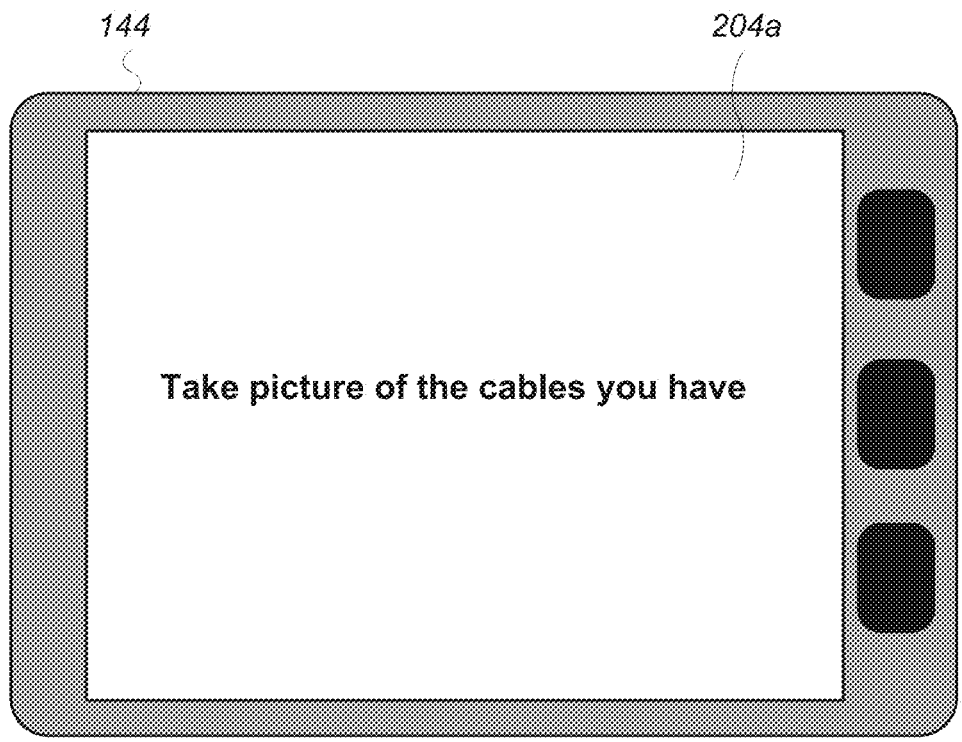
FIGS. 2A-2R illustrate various example screenshots of a mobile computing device that utilizes embodiments described herein for augmented reality installation and troubleshooting assistance.
Figure 2B:
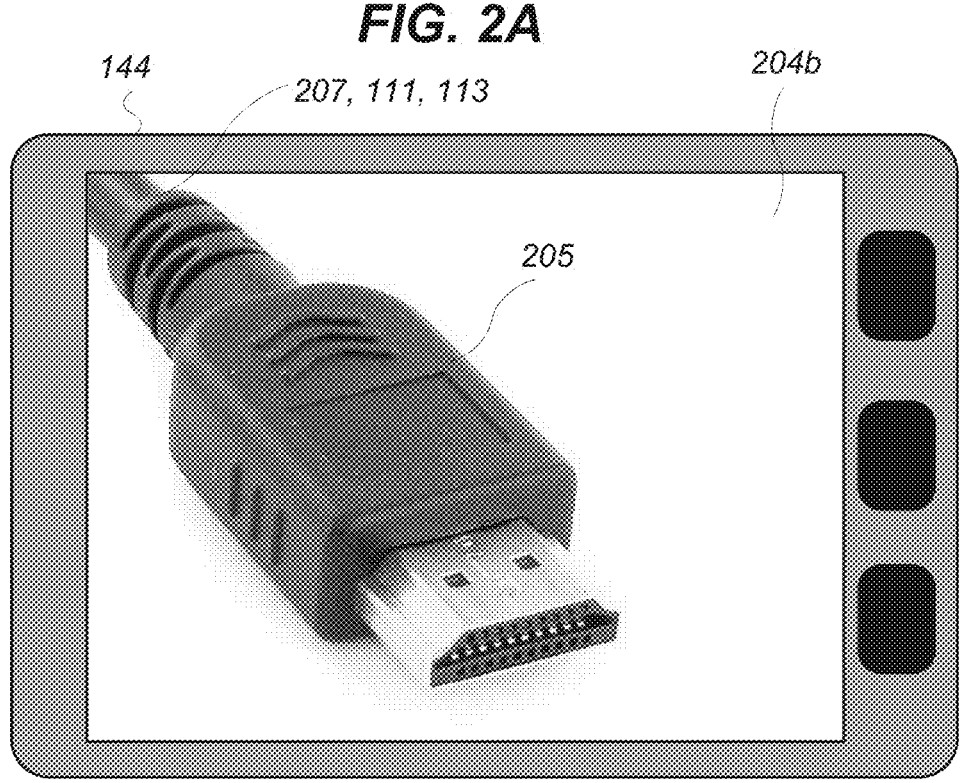
Figure 2C:
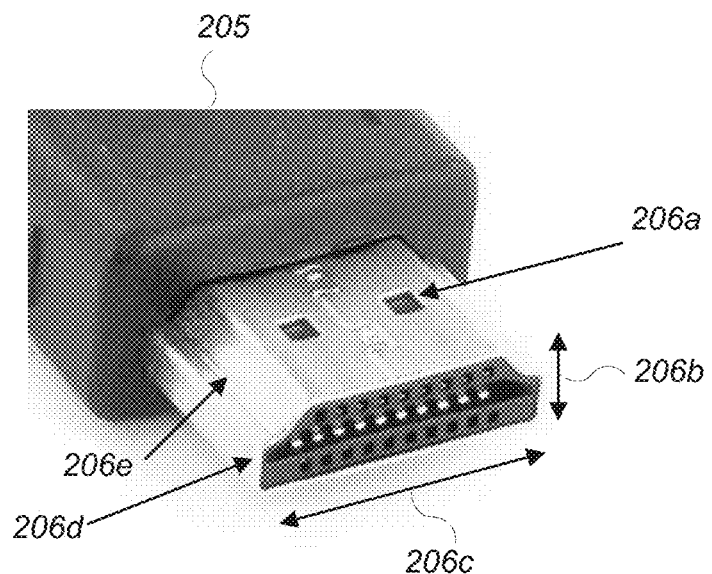
Figure 2D:
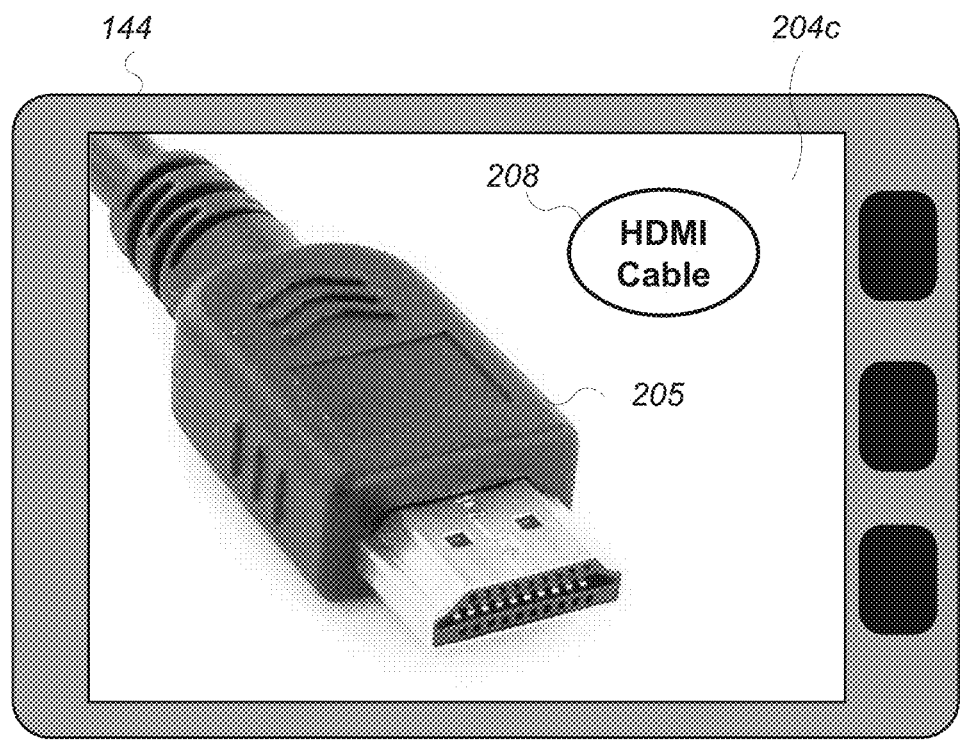
Figure 2E:
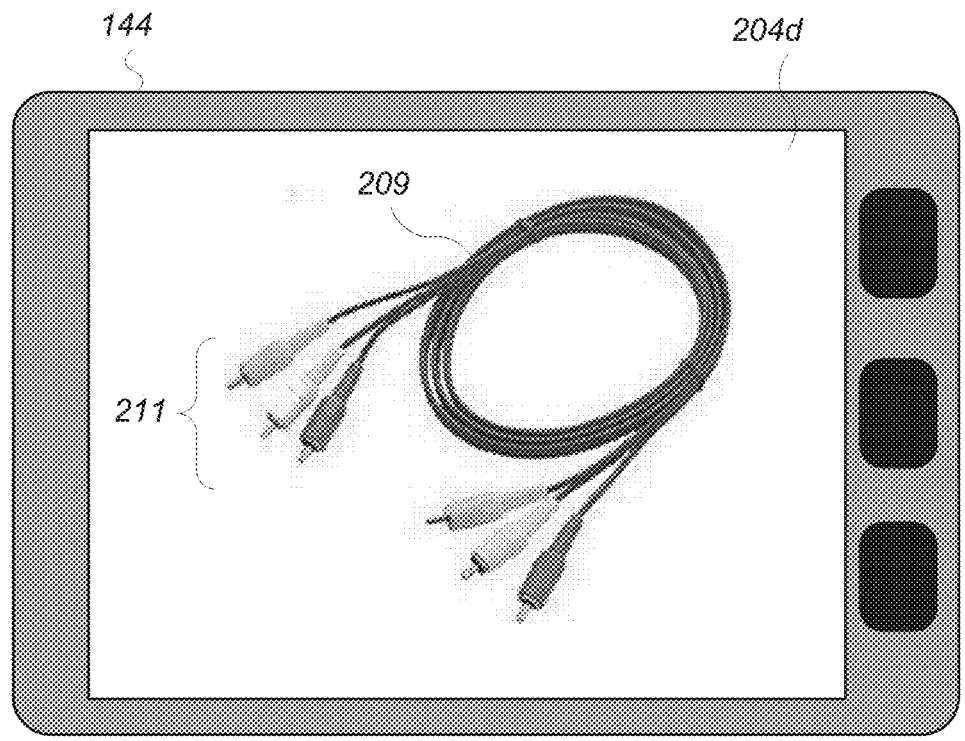
Figure 2F:
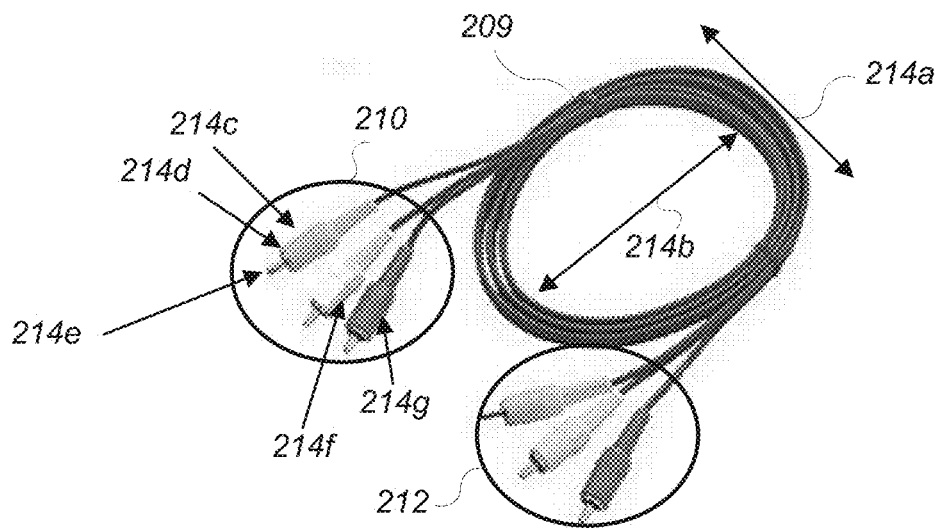
Figure 2G:
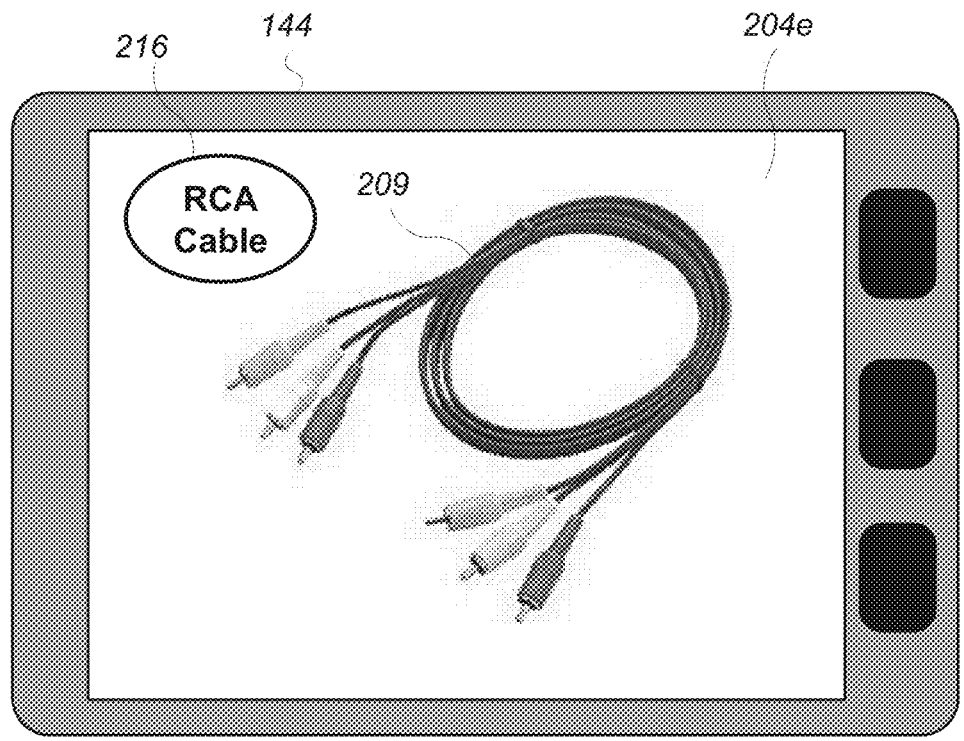
Figure 2H:
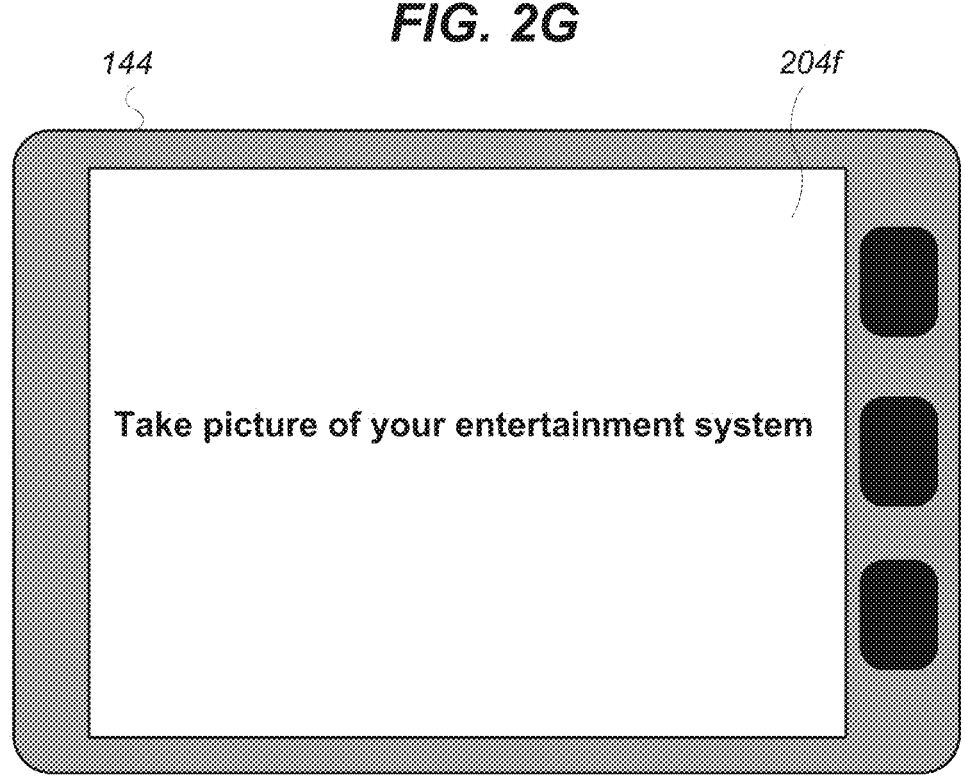
Figure 2I:
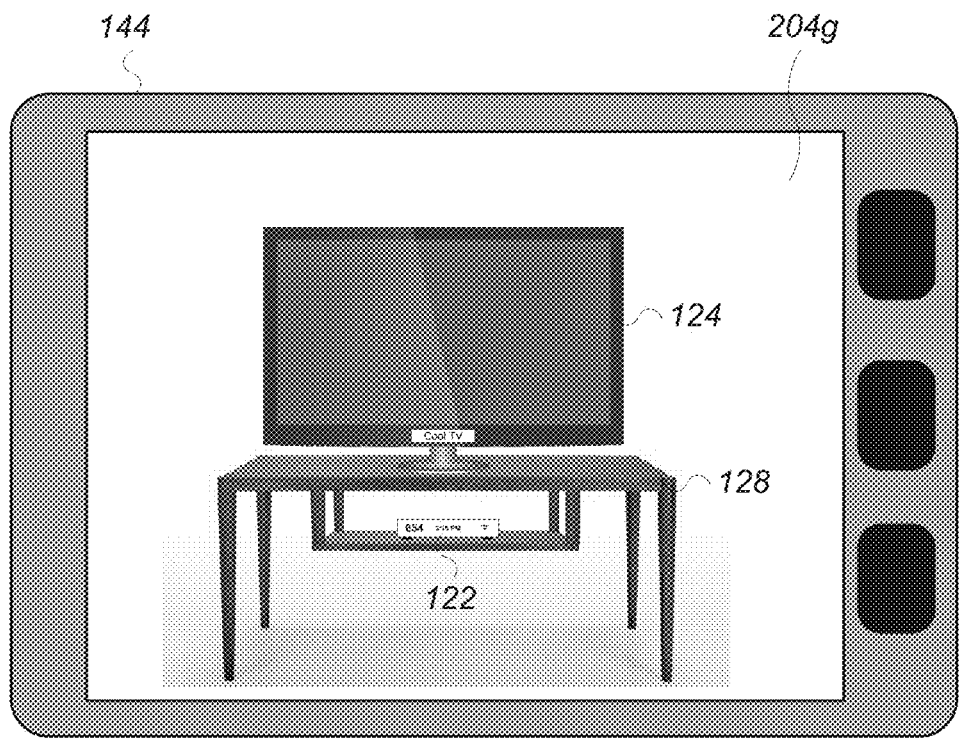
Figure 2J:
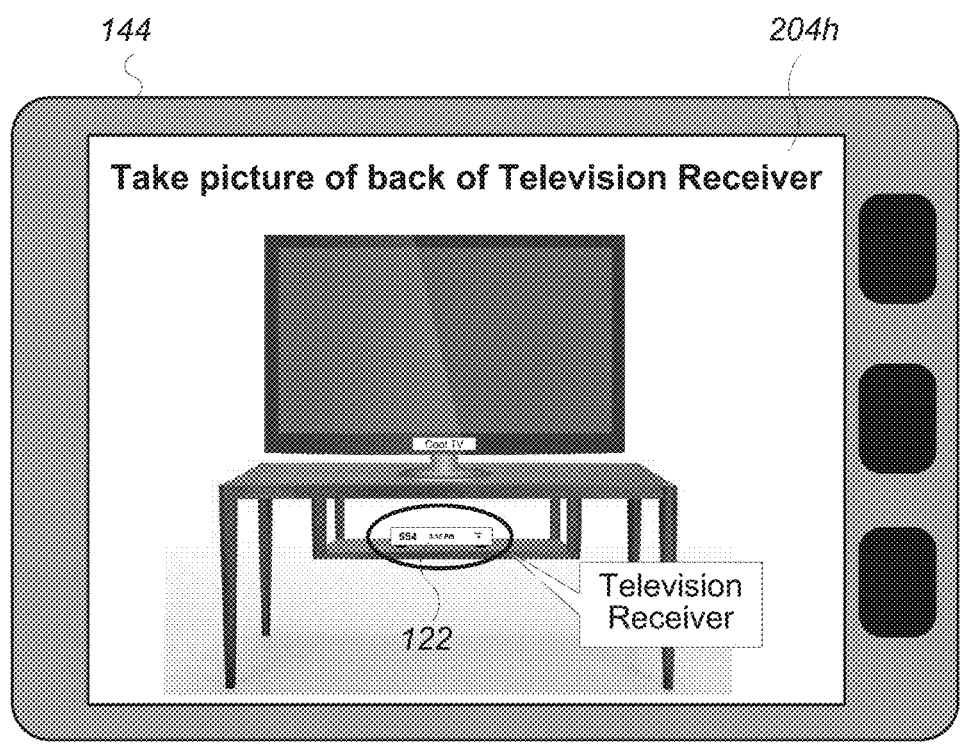
Figure 2K:
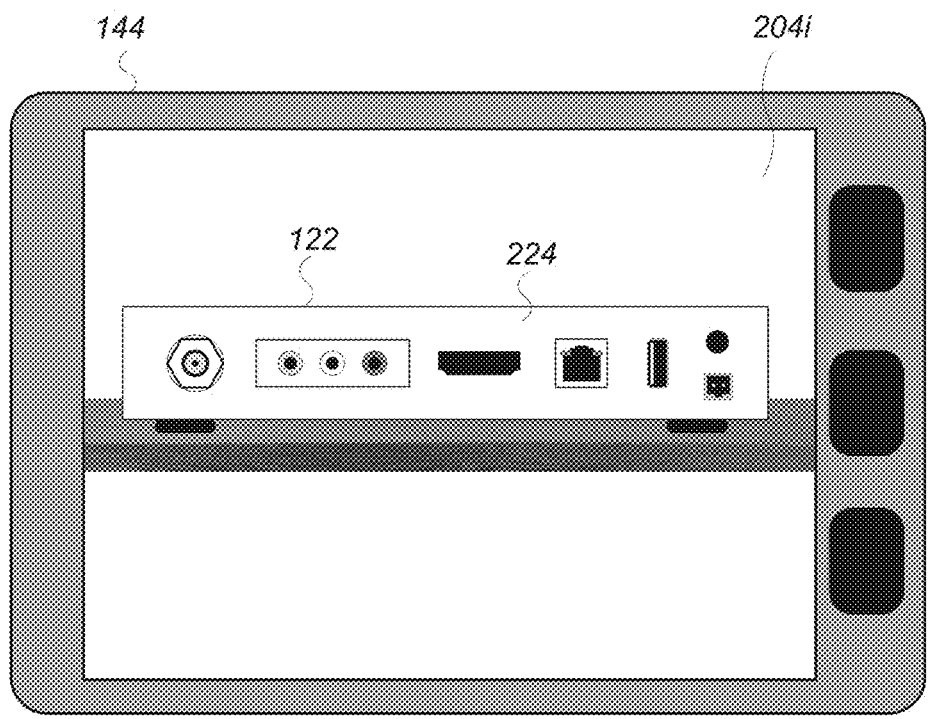
Figure 2L:
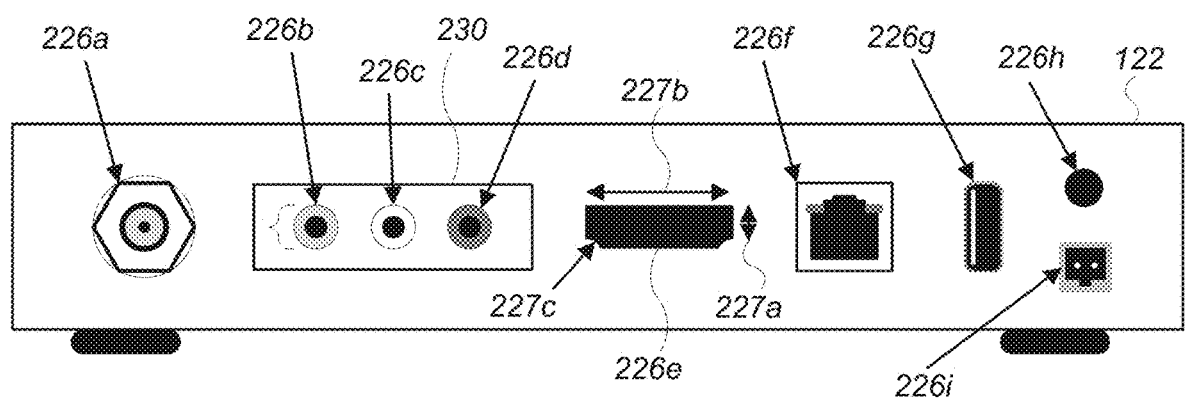
Figure 2M:
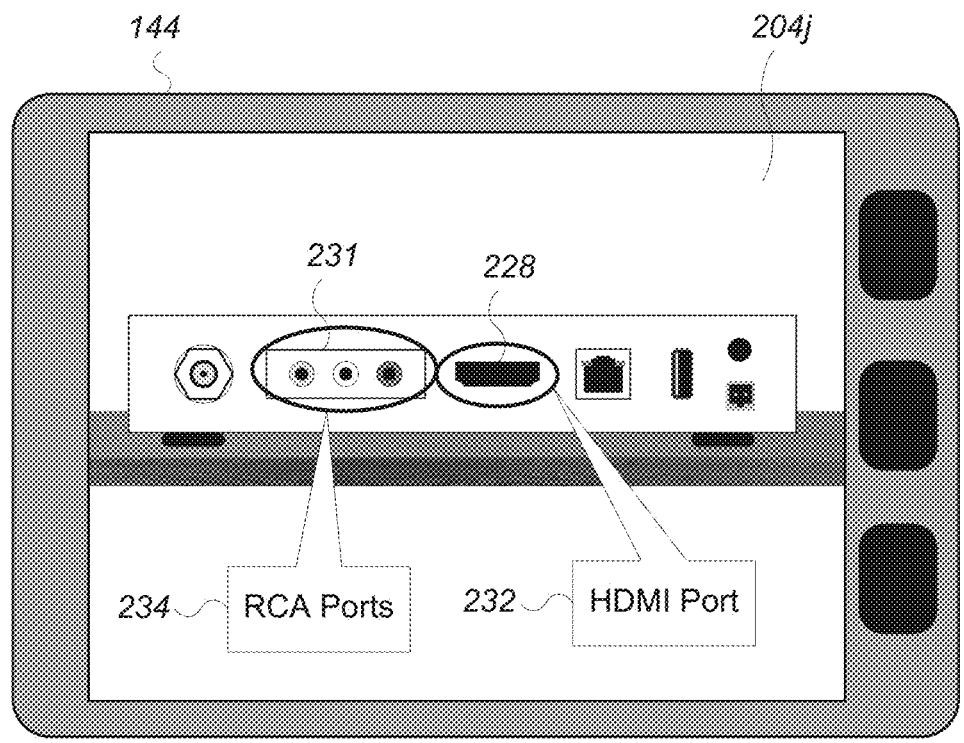
Figure 2N:
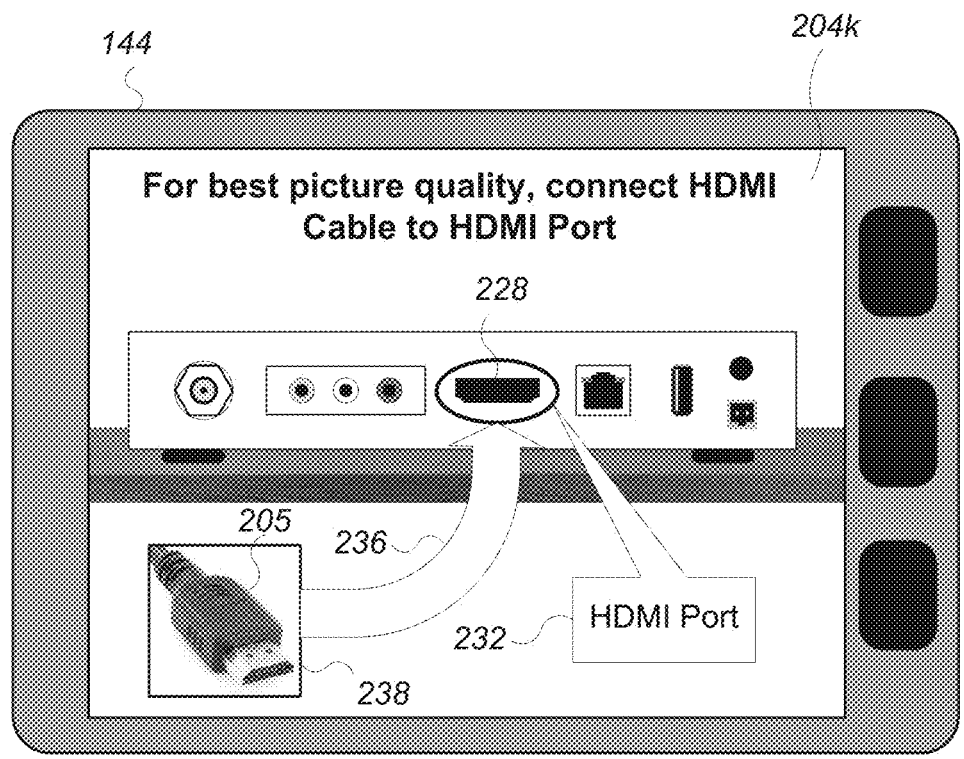
Figure 2O:
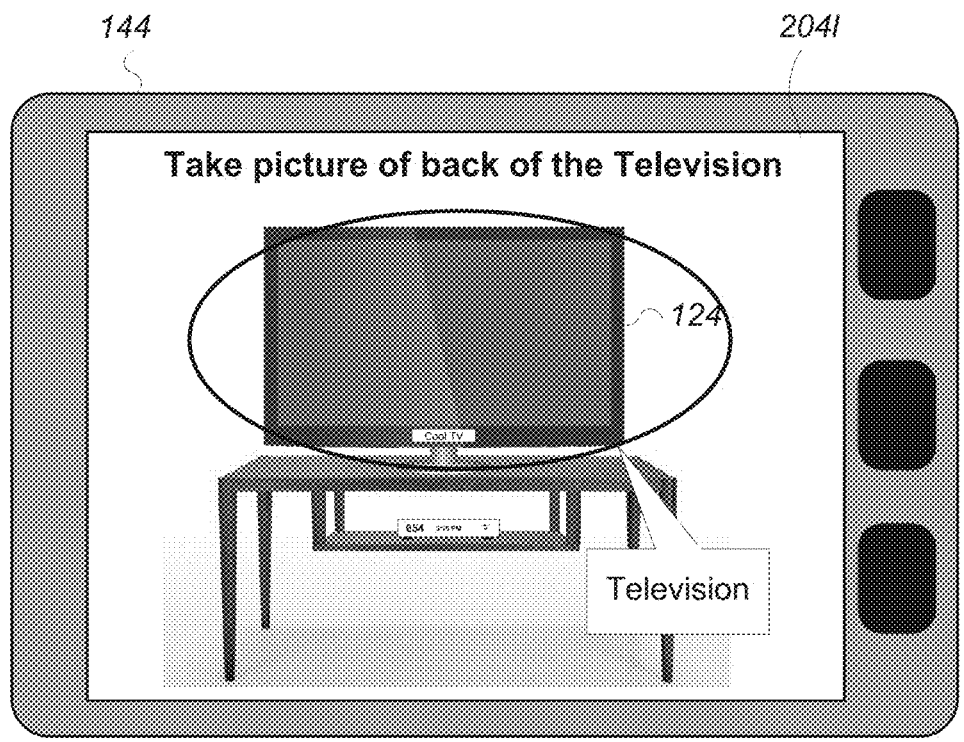
Figure 2P:
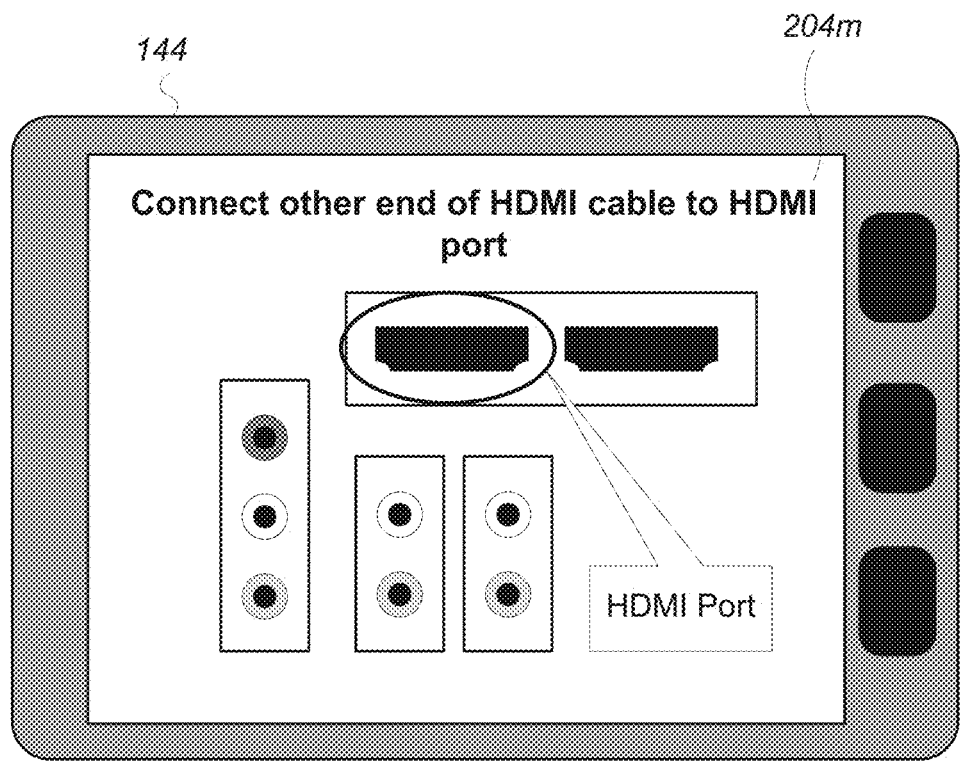
Figure 2Q:
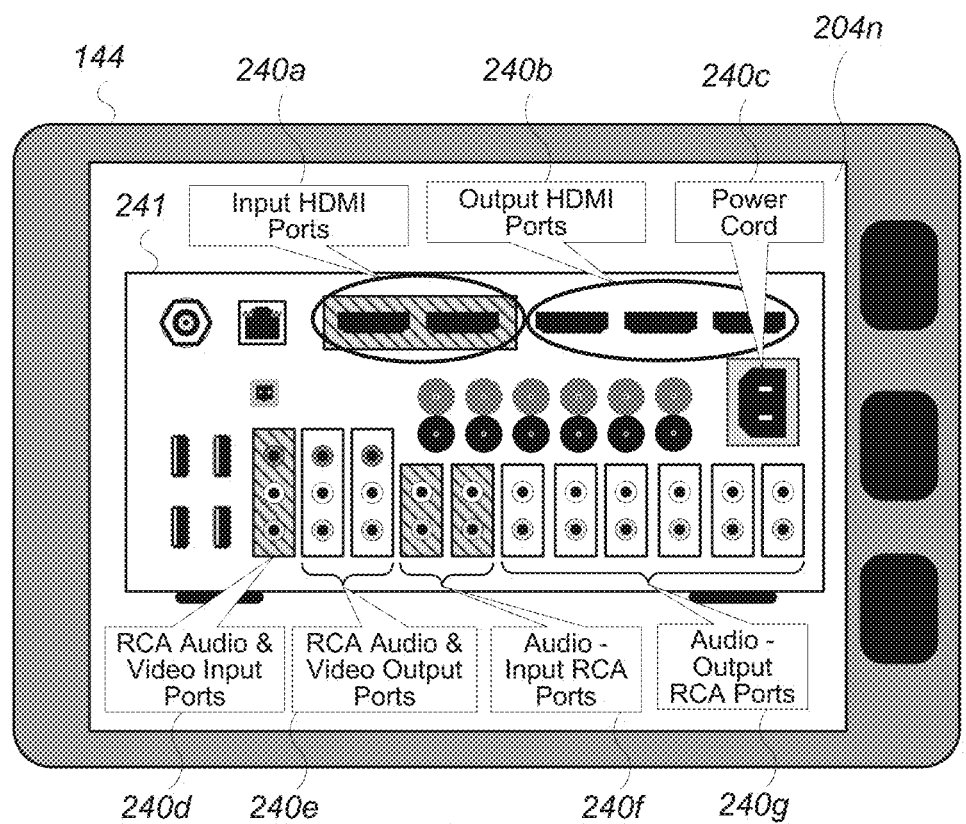
Figure 2R:
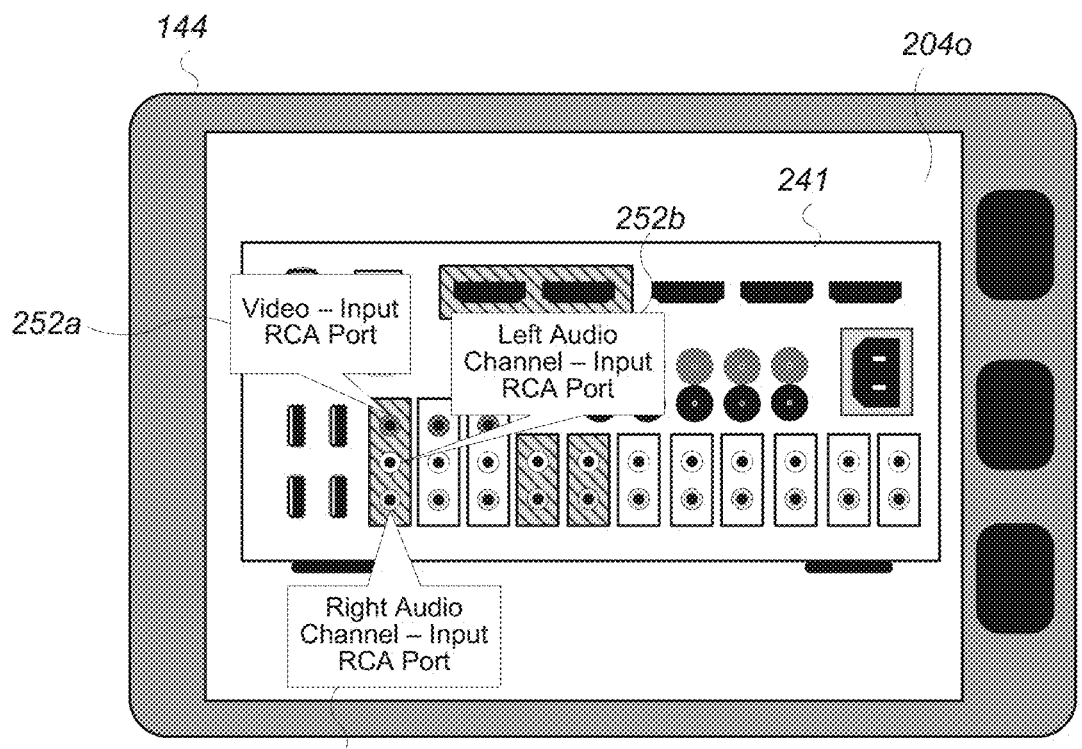

FIGS. 2A-2R illustrate various example screenshots of a mobile computing device that utilizes embodiments described herein for augmented reality installation and troubleshooting assistance. FIG. 2A illustrates a first screenshot 204a in which the mobile computing device 144 instructs the user to take a picture of image of one or more cables the user has and, in particular, the connectors of the user's cables. In various embodiments, this screenshot may be displayed after a user has started or configured the application or program that is to provide installation or troubleshooting assistance.

FIG. 2B illustrates a screenshot 204b that is displaying an image of cable 207 with a connector 205. The cable 207 can be the wired connection 111, 113 or some other wired connection, such as a wired connection between the television receiver 122, the display device 124 and one or more peripheral devices 126. As mentioned above, the mobile computing device 144 can take still images of cable connector 205 or multiple images as part of a video. The mobile computing device 144 then employs embodiments described herein to analyze the image to determine a plurality of non-text characteristics of cable connector 205.

FIG. 2C illustrates example non-text characteristics of an HDMI cable connector. For example, the non-text characteristics may include a width 206c of the connector 205, a height 206b of the connector, a number of pins 206d, and other facets 206e or features 206a. As described in more detail below, these non-text characteristics may be compared to non-text characteristics of known cable connectors to determine the type of connector and cable. It should be noted that some cables have the same connectors on each end of the cable, while other cables have different connectors on each end.

Upon determining that cable connector 205 is an HDMI cable connector, the image of cable connector 205 may be modified to include, or overlaid onto, text 208 to indicate that cable connector 205 is for an HDMI cable, which is illustrated by screenshot 204c in FIG. 2D. In other embodiments, graphics, images, or other information may be added or overlaid onto the image.

FIG. 2E illustrates a screenshot 204d of another cable 209. In this example, each end of cable 209 includes a plurality of cable connectors 211. The cable 209 can correspond to wired connections 111, 113 or can be a different wired connection, such as a wired connection between the television receiver 122, the display device 124 and one or more peripheral devices 126.

FIG. 2F illustrates example non-text characteristics of an RCA cable and its cable connectors. For example, one non-text characteristic may be connector sets 210 and 212 each having multiple connectors, such as connecters 214c, 214f, and 214g. Each separate connector may be a different color. For example, connector 214c may be yellow, connector 214f may be white, and connector 214g may be red. These colors can be used as non-text characteristics of cable 209. Other non-text characteristics can include a number, diameter, or length of pin 214e of each connector; a width or diameter of housing 214d of each connector, or other non-text characteristics. As described in more detail below, these non-text characteristics may be compared to non-text characteristics of known cable connectors to determine the type of connectors and cable.

In some embodiments, other characteristics of cable 209 may also be determined. For example, in this illustration, cable 209 is looped multiple times into a circle. A width 214a, length 214b, and number of loops may be determined. From this information the total length of cable 209 can be determined. This information may be used by the mobile computing device 144 to determine if cable 209 is long enough to reach from one electronic device to another, such as by estimating distances between electronic devices in an entertainment system, as discussed elsewhere herein.

FIG. 2G illustrates a screenshot 204e that includes the image of cable 209 along with text 216 to indicate that cable 209 is an RCA cable. Again, this augmented image may be displayed upon determining that cable 209 is an RCA cable. Moreover, in other embodiments, graphics, images, or other information may also be added or overlaid onto the image to indicate the type cable.

Although only a few example cables and cable connectors are mentioned herein, the system may utilize similar embodiments to determine other numbers and types of cables based on non-text characteristics of their connectors. Similarly, the user may be prompted to take images of each separate cable he or she has before proceeding to a next step in the installation or troubleshooting process.

Once one or more cables and their connectors are determined, the mobile computing device 144 instructs the user to take a picture or image of their entertainment system, which is illustrated by screenshot 204f in FIG. 2H.

FIG. 2I illustrates a screenshot 204g of the entertainment system 128. In this example, the entertainment system 128 includes a television receiver 122 and a display device 124.

If the next step is to connect a cable to the television receiver 122, then the mobile computing device 144 tries to identify an input/output port on the television receiver 122. In some situations, the television receiver, or other electronic device, may be situated so that no ports are visible in the captured image. In other situations, the image may be of too poor quality to identify any ports on the electronic device. If no ports are identifiable, or if the mobile computing device 144 is configured to notify the user of one or more electronic devices in the image, then it may augment the image to highlight the television receiver 122, or other electronic devices. In some embodiments, the various different electronic devices may be determined based on their shape or size, color characteristics of the devices, or other identifiers. For example, in some embodiments, a particular electronic device may be identified based on a QR codes, audible tones, LED lights. In other embodiments, a particular layout of buttons, logos, display screen, input/output ports, or some combination thereof. Similarly, a number and spacing of ventilation slats can also be used to identify a particular type of electronic device.

FIG. 2J illustrates a screenshot 204h of an instruction to the user to take an image or picture of the back or other panel of the television receiver 122 that includes input/output ports. As mentioned above, the mobile computing device 144 can continuously instruct or augment the images as the user is moving the television receiver 122 and notify the user once the input/output ports on the television receiver 122 are visible in the image.

FIG. 2K illustrates a screenshot 204i of a back panel 224 of the television receiver 122. Although FIG. 2K shows the television receiver 122 directly in the middle of the image, in some situations the television receiver 122 may be off center or parts of the television receiver 122 may not be visible in the image. In these situations, the mobile computing device 144 can instruct the user, e.g., via audible commands, to move the camera of the mobile computing device 144 in a particular direction so that all ports of the television receiver 122 are visible in the image. Similarly, as discussed in more detail above, the mobile computing device 144 can automatically adjust lighting, zoom, focus, color, or other parameter of the camera on the mobile computing device 144 to obtain better images of the television receiver 122 to identify the ports on the television receiver 122.

The mobile communication device 144 identifies each possible port 226a-226i based on one or more non-text characteristics of the ports. For example, port 226a may be identified as a coaxial input port based on the overall shape of the port, whereas port 226e may be identified as an HDMI port based on a height 227a, a width 227b, one or more facets 227c, or a combination thereof.

In some embodiments, other features or characteristics of the television receiver 122 may be utilized separately from, or in combination with, the non-text characteristics of the ports themselves to identify an input/output port or whether it is an input port, output port, or bi-directional port. For example, television receiver 122 includes a box 230 around ports 226b-226d to indicate an output port. Based on the fact that there are three ports inside the box, along with other non-text characteristics of the ports themselves, the mobile computing device 144 can identify that these ports are RCA output ports. In particular a color of these ports can then be used to identify the individual ports as a video port, a left audio port, or a right audio port.

It should be recognized that other non-text characteristics of the ports or the television receiver 122 may be utilized to identify the various different types of ports on the television receiver 122. Also, it should be understood that the illustrated ports are for illustration purposes and other numbers or types of input/output ports may be included in the television receiver 122.

Upon determining the types of ports on the television receiver 122, the image of the television receiver 122 may be modified or overlaid with text, graphics, or images to indicate the type of each port. In some embodiments, only those ports that are compatible with the cable connectors the user previously took images of may be identified. For example, FIG. 2M illustrates a screenshot 204j of a modified or augmented image of the television receiver 122. In this illustration, RCA ports 231 and HDMI port 228 are highlighted with text 234 and 232, respectively, to indicate which port is compatible with RCA cable 209 and which port is compatible with HDMI cable 207 and its connector 205.

The mobile computing device 144 may provide yet additional functionality to the user. For example, in some embodiments, the user may click on or select a particular port as a preferred port to use. In other embodiments, the mobile computing device 144 may select a preferred port based on the functionality or data quality associated with a particular port or cable. For example, as illustrated by screenshot 204k in FIG. 2N, the mobile communication device 144 selects HDMI port 228 as being compatible with the user's HDMI cable 207 and has a higher picture quality than the other ports that are compatible with the user's RCA cable 209. In some embodiments, the mobile computing device 144 may also display image 238 of cable connector 205 with an indicator 236 showing into which port the user's cable is to be plugged.

In some embodiments, the mobile computing device 144 may assist the user in plugging the cable into the appropriate port. For example, as the mobile computing device 144 is still taking "live" video of the television receiver 122, the user may attempt to plug the HDMI connector 205 into the HDMI port 228. However, if the user cannot see the cable or the port, then they may have difficultly plugging the cable into the port. As such, the mobile computing device 144 can instruct the user, such as via audible commands, which way to move cable connector 205 so that it lines up with the HDMI port 228.

In yet other embodiments, the mobile computing device 144 can utilize additional information about the user's cables and the environment surrounding the entertainment system to provide additional suggestions to the user. For example, the mobile computing device 144 can utilize the image of the entertainment system to determine an estimated distance between the television receiver 122 and display device 124. If a length of the HDMI cable 207 and the RCA cable 209 are determined, as mentioned above, then the mobile computing device 144 may select the cable that has the highest likelihood of reaching between to two devices. If both cables will reach, then the cable that supports the better quality, framerate, etc. is selected.

If neither cable is compatible with the ports on the television receiver, or if the mobile computing device 144 determines that the user's cables are not long enough, then the mobile computing device 144 may provide information to the user about an appropriate cable to purchase. Such information can include the type of cable, a length of the cable, a location where it can be purchased, etc. In some embodiments, this information may include URLs, advertisements, or other information to assist the user in purchasing the proper cable. Likewise, if the user is instructed to purchase a cable, the user can then utilize the mobile computing device 144 to take images of cables and connectors in the store, and the mobile computing device 144 can perform embodiments described herein to determine which cable is appropriate for the user.

Moreover, in some embodiments, the images of the entertainment system 128 can be further utilized to help organize a plurality of electronic devices. For example, the mobile computing device can identify which electronic devices the user has, such as based on characteristics of the electronic devices, and how much space is available in the entertainment system 128. For example, the mobile computing device can utilize the image of the entertainment system 128 to identify and determine the dimensions for each compartment or shelf that can hold an electronic device. The mobile computing device can then compare these dimensions to the dimensions of the electronic devices to determine if and where the electronic devices can fit into the entertainment system 128. Similarly, the mobile computing device can determine an arrangement of the electronic devices in the entertainment system 128, such as based on the previously determined length of the user's cables, how the devices are connected, and the functionality of the devices. For example, if all electronic devices connect to an audio receiver, then the mobile computing device 144 can determine an arrangement of devices with the audio receiver positioned in a compartment or shelf of the entertainment system that is relatively central to the other electronic devices.

Although not illustrated, the mobile computing device 144 may ask the user to take another image of the television receiver after the user has plugged the cable into the port to verify that the proper cable and port were utilized.

FIG. 2O illustrates a screenshot 204I of an image of the entertainment system 128. Since the user has already connected one end of the HDMI cable 207 to the television receiver 122, the mobile computing device 144 may next instruct the user to take an image of the back of the display device 124. Again, these instructions and indications of the proper electronic device may be added to or overlaid onto the image of the entertainment system. In some embodiments, the mobile computing device 144 may store images of the cables, cable connectors, entertainment system, or the electronic devices so additional references can be made to those devices and components, as in this example of redisplaying the entertainment system 128.

Similar to what is illustrated and described in conjunction with FIGS. 2L-2N, the mobile computing device 144 can determine which input/output ports are on the display device 124 and which ports are compatible with the user's cables. FIG. 2P illustrates a screenshot 204m of an image of the ports on the display device 124, in which the HDMI port is highlighted. In this way, the user knows in which port on the display device 124 to plug the other end of the cable that was previously plugged into the television receiver 122.

FIGS. 2Q illustrates an alternative example of a screenshot 204n of an audio receiver 241 in which the mobile computing device 144 has identified various input/output ports on the audio receiver 241. In this illustration, the mobile computing device 144 has augmented the image of the audio receiver 241 to include various text 240a-240g to indicate the identified ports on the audio receiver 241, similar to what is described above.

As mentioned above, a user may be enabled to click on or select a particular port as a primary port, or to receive additional about the port. For example, the user can select RCA input port associated with text 240d, which provides additional information 252a-252c illustrated by screenshot 204o in FIG. 2R. This additional information can further aid the user in plugging the appropriate cable connector into the appropriate port.

Again, it should be appreciated that the above examples can be performed with still images as well as with video frames to create an augmented reality of the various cables and electronic devices so that a user knows which cables and input/output ports are compatible with one another. These embodiments can be used in various combinations to provide installation guidance as well as troubleshooting assistance. Moreover, although these examples discuss television receivers and display devices, embodiments described herein can be utilized to connect cables to other types of electronic devices.

The operation of certain aspects will now be described with respect to FIGS. 3-6. In at least one of various embodiments, processes 300, 400, 500, and 600 described in conjunction with FIGS. 3-6, respectively, may be implemented by or executed on one or more computing devices, such as mobile device 144 in FIG. 1.

Figure 3:
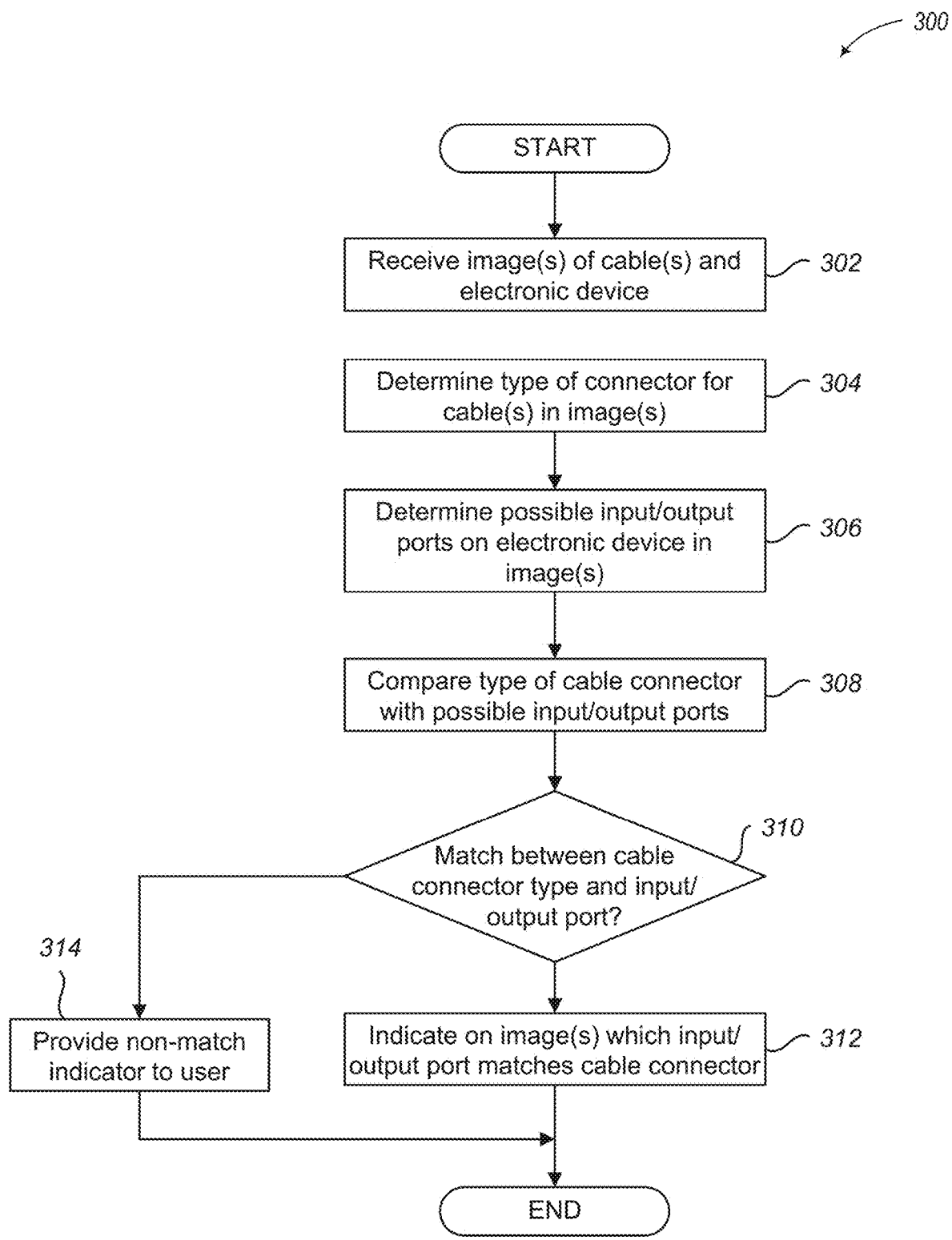
FIG. 3 illustrates a logical flow diagram generally showing one embodiment of an overview process for providing augmented reality to assist in connecting cables to an electronic device in accordance with embodiments described herein.

FIG. 3 illustrates a logical flow diagram generally showing one embodiment of an overview process for providing augmented reality to assist in connecting cables to an electronic device in accordance with embodiments described herein.

Process 300 begins, after a start block, at block 302, where one or more images of one or more cables and an electronic device is received. In some embodiments, a single image may have pictured both the cable(s) and the electronic device. In other embodiments, a user may capture one image of the cables and then capture another image of the electronic device.

Process 300 continues to block 304, where a type of connector for the one or more cables in the image is determined. One embodiment of determining the type of connector of a cable in an image is described in more detail below in conjunction with FIG. 5. Briefly, however, non-text characteristics of the connectors of the cable in the image are analyzed and compared with non-text characteristics of known connectors.

Process 300 proceeds to block 306, where a one or more input/output ports on the electronic device in the image are determined. One embodiment of determining the input/output ports on an electronic device in an image is described in more detail below in conjunction with FIG. 6. Briefly, however, non-text characteristics of each possible input/output port of the electronic device in the image is analyzed and compared with non-text characteristics of known input/output ports.

Process 300 continues next at block 308, where the type of cable connector determined at block 304 is compared with the possible input/output ports determined at block 306. In some embodiments, this comparison may also include an analysis of whether a port needs to be an input port or an output port, depending on the electronic device in the image, the functionality of the cable between electronic devices, the installation or troubleshooting instructions associated with the cable or electronic device, the layout of a plurality of electronic devices, etc.

Process 300 proceeds next to block 310, where a determination is made whether there is a match between the type of cable connector and an input/output port on the electronic device. If there is a match, process 300 proceeds to block 312; otherwise, process 300 proceeds to block 314.

At block 314 a non-match indicator is presented to the user. In at least one embodiments, the image of the cable or electronic device may be modified, or have overlaid thereon text, labels, logos, symbols images, or other data to indicate that none of the cable(s) in the image have a connector that is compatible with any input/output ports on the electronic device in the image. After block 314, process 300 terminates or returns to a calling process to perform other actions.

If, at decision block 310, there is a match between a cable connector and an input/output port, then process 300 proceeds from decision block 310 to block 312. At block 314, the image(s) of the cable or electronic device may be modified, or have overlaid thereon, text, labels, logos, symbols, images, or other data to indicate which particular cable connector and input/output ports are compatible with one another. As discussed in more detail above, such image modification may include boxes, circles, highlights, arrows, or other graphics or text to label the matching cable connector and input/output port. After block 314, process 300 terminates or returns to a calling process to perform other actions.

Although process 300 is illustrated as utilizing single images, embodiments are not so limited. Rather, process 300 may loop from blocks 314 or 312 to block 302 to continually process a plurality of image frames of a video. In this way, a user can utilize their mobile computing device to display a "live" image of the cables and the electronic device, while the mobile computing device is modifying the video with the appropriate match or non-match indicators—thus, providing the user an augmented reality of the electronic device and the cables.

Figure 4:
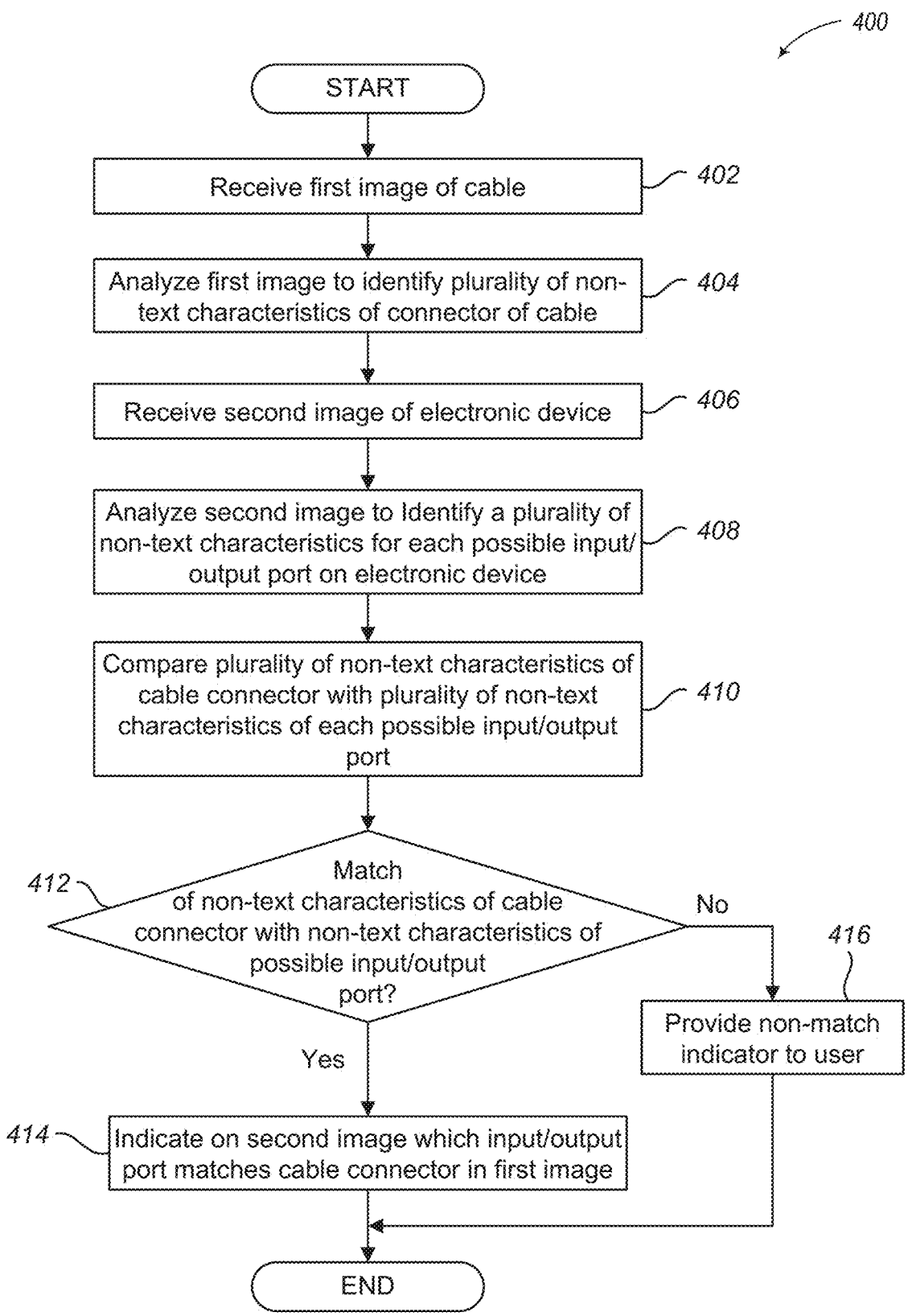
FIG. 4 illustrates a logical flow diagram generally showing one embodiment of an alternative process for providing augmented reality to assist in connecting cables to an electronic device in accordance with embodiments described herein.

FIG. 4 illustrates a logical flow diagram generally showing one embodiment of an alternative process for providing augmented reality to assist in connecting cables to an electronic device in accordance with embodiments described herein. Briefly, process 400 compares non-text characteristics of a cable connector with non-text characteristics of input/output ports to identify compatible ports and connectors, whereas process 300 in FIG. 3 determined a type of cable connector and a type of port, which were then compared.

Process 400 starts, after a start block, at block 402, where a first image of a cable is received. In various embodiments, this image may be a single image captured by a user's mobile device 144 or it may be a single image frame in a video being captured by the mobile device 144. As described herein, the image may have pictured therein one or a plurality of cables. But for ease of discussion, process 400 will be described with respect to a single cable, and one of ordinary skill in the art would be able to apply this process to multiple cables in one or more images.

Process 400 proceeds to block 404, where the first image is analyzed to identify a plurality of non-text characteristics of a connector of the cable in the first image. Non-text characteristics can include a length of the cable, a length of the connector, a width or diameter of the connector or the cable, a number of pins associated with the connector, an overall shape or size of the connector, one or more side profile shapes or sizes of the connector, a front-face shape or size of the connector, color(s) of the connector or the cable, a shape or size of the pins of the connector, a shape or size of a bracket or other connecting device attached to the connector, textures of the connector or the cable, or other non-text characteristics. In some other embodiments, textual characteristics may also be utilized alone or in combination with the non-textual characteristics.

As mentioned above, many non-text characteristics include a size of the connector, cable, pins, etc. One of ordinary skill in the art should recognize that these sizes may be actual metric system or American system dimensions, or they may be relative sizes. For example, the diameter of a pin of a connector may be determined relative to an overall width of the connector casing. In another example, one or more facets of a given face of the connector may be compared to other facets of the same face or a different face of the connector to determine relative size of each facet.

Process 400 continues to block 406, where a second image of an electronic device is received. Similar to what is described above in conjunction with block 402, this image may be a single image captured by a user's mobile device 144 or it may be a single image frame in a video being captured by the mobile device 144. As described herein, the image may have pictured therein one or a plurality of electronic devices. But for ease of discussion, process 400 will be described with respect to a single electronic device, and one of ordinary skill in the art would be able to apply this process to multiple electronic devices in one or more images.

Process 400 proceeds to block 408, where the second image is analyzed to identify a plurality of non-text characteristics of each possible input/output port on the electronic device in the second image. Non-text characteristics can include a shape or size of the port, number of facets of the port, color(s) of the port, a number of pins or pin accepters associated with the port, a shape or size of the pins of the port, a shape or size of a bracket or other connecting device attached to the port, textures or colors of a surface of the electronic device surrounding the port, borders on the surface of the electronic device surrounding the port, or other non-text characteristics. In some other embodiments, textual characteristics may also be utilized alone or in combination with the non-textual characteristics.

As mentioned above, many non-text characteristics include a size of the port. One of ordinary skill in the art should recognize that these sizes may be actual metric system or American system dimensions, or they may be relative sizes. For example, the width of a port may be determined relative to height of the port. In another example, the diameter of a pin accepter of a port may be compared to an overall diameter of the port.

In some embodiments, a possible input/output port may be identified based on a set of non-text characteristics that are proximal within a predetermined distance to one another. In other embodiments, a possible input/output port may be identified based on a distance from one set of non-text characteristics to another set of non-text characteristics.

Process 400 continues next at block 410, where the plurality of non-text characteristics of the cable connector is compared with the plurality of non-text characteristics of each possible input/output port. In various embodiments, this comparison may include comparing multiple different combinations of non-text characteristics of the connector with different combinations of non-text characteristics of possible input/output ports.

Process 400 proceeds next to decision block 412, where a determination is made whether there is a match between the non-text characteristics of the cable connector and the non-text characteristics of the possible input/output port. If there is a match, process 400 proceeds to block 414; otherwise, process 400 proceeds to block 416.

At block 416, a non-match indicator is provided to the user. In various embodiments, block 416 implements embodiments of block 314 to provide non-match indicators to the user. After block 416, process 400 terminates or returns to a calling process to perform other actions.

If, at decision block 412, there is a match between the non-text characteristics of the cable connector and the non-text characteristics of the possible ports on the electronic device, then process 400 flows from decision block 412 to block 414. At block 414, the second image is modified to include an indicator as to which input/output port(s) match the cable connector. In various embodiments, block 414 implements embodiments of block 312 to provide an indicator of matching cable connector and port(s) on the image. After block 416, process 400 terminates or returns to a calling process to perform other actions.

Similar to process 300, process 400 can utilize a single images or process 400 may loop from blocks 414 or 416 to block 406 to continually process a plurality of image frames of a video. In this way, a user can utilize their mobile device to display a "live" image of the electronic device, while also overlaying non-match or match indicators on the video frames—thus, providing the user an augmented reality of the electronic device.

Figure 5:
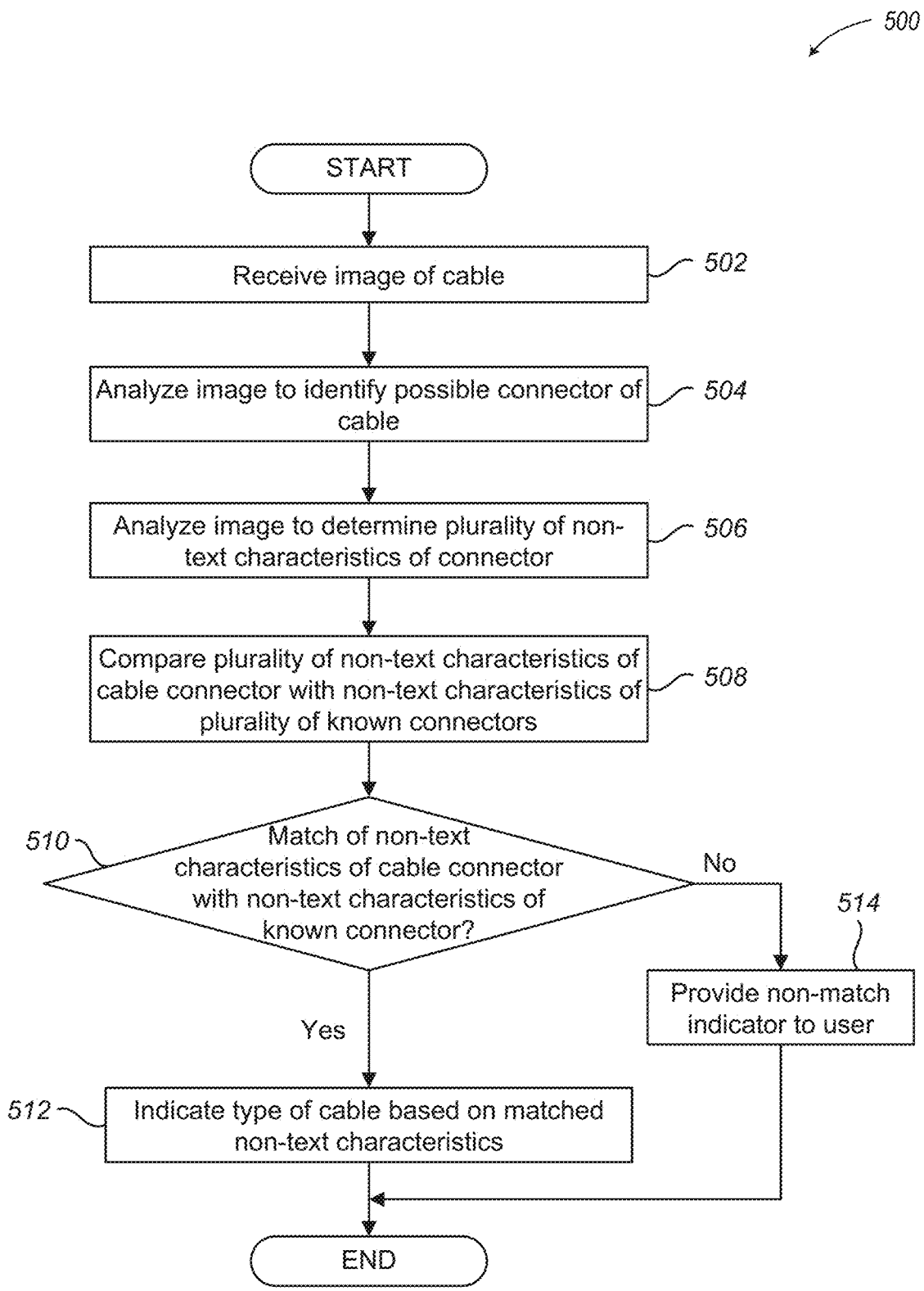
FIG. 5 illustrates a logical flow diagram generally showing one embodiment of an overview process for determining a type of cable or cable connector for providing augmented reality to assist in connecting cables to an electronic device in accordance with embodiments described herein.

FIG. 5 illustrates a logical flow diagram generally showing one embodiment of an overview process for determining a type of cable for providing augmented reality to assist in connecting cables to an electronic device in accordance with embodiments described herein.

Process 500 begins at block 502, where an image of a cable is received. In various embodiments, block 502 implements embodiments of block 402 of FIG. 4 to receive an image of a cable.

Process 500 continues at block 504, where the image is analyzed to identify a possible connector of the cable. In various embodiments, a possible connector of the cable may be determined based on an identified end of the cable.

Process 500 proceeds to block 506, where the image is analyzed to determine a plurality of non-text characteristics of the connector. In various embodiments, block 506 implements embodiments of block 404 of FIG. 4 to determine a plurality non-text characteristics of the connector.

Process 500 continues next at block 508, where the plurality non-text characteristics of the cable connector are compared with non-text characteristics of a plurality of known connectors. In various embodiments, a database of known connectors and their non-text characteristics may be stored and used to compare with the non-text characteristics of the cable connector.

Process 500 proceeds next to decision block 510, where a determination is made whether there is a match between the non-text characteristics of the cable connector and non-text characteristics of a known connector. If there is a match, process 500 proceeds to block 512; otherwise, process 500 proceeds to block 514.

At block 514, a non-match indicator is provided to the user. In various embodiments, the image of the cable may be modified, or have text, labels, logos, symbols, images, or other data overlaid thereon to indicate the connector in the image does not match known connectors. A non-match may occur when the image of the connector does not show enough non-text characteristics for a positive match with known connectors. After block 514, process 500 terminates or returns to a calling process to perform other actions.

If, at decision block 510, there is a match between the non-text characteristics of the cable connector and the non-text characteristics of known connectors, then process 500 flows from decision block 510 to block 512. At block 512, an indication of the type of cable is provided based on the matched non-text characteristics. In some embodiments, the image of the cable is modified to include text, labels, logos, symbols, images, or other data to indicate the type of connector and its cable. After block 512, process 500 terminates or returns to a calling process to perform other actions.

Similar to process 300, process 500 can utilize still image frames or process 500 may loop from blocks 514 or 512 to block 502 to continually process a plurality of image frames of a video. In this way, a user can utilize their mobile device to display a "live" image of one or more cables, while also overlaying an indicator of the type of cable—thus, providing the user an augmented reality of the cable.

Figure 6:
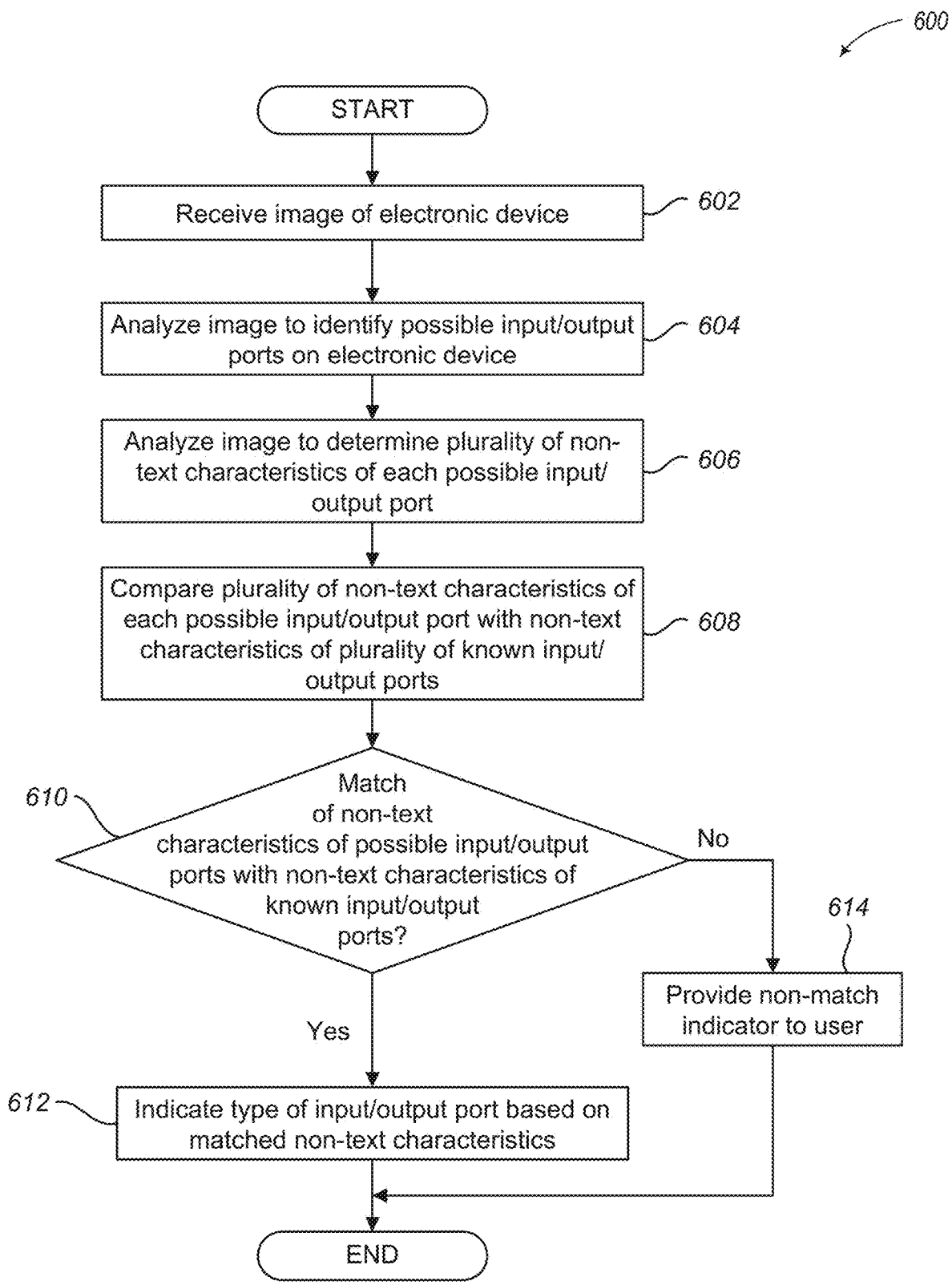
FIG. 6 illustrates a logical flow diagram generally showing one embodiment of an overview process for determining a type of connector port for providing augmented reality to assist in connecting cables to an electronic device in accordance with embodiments described herein.

FIG. 6 illustrates a logical flow diagram generally showing one embodiment of an overview process for determining a type of connector port for providing augmented reality to assist in connecting cables to an electronic device in accordance with embodiments described herein.

Process 600 begins at block 602, where an image of an electronic device is received. In various embodiments, block 602 implements embodiments of block 406 of FIG. 4 to receive an image of an electronic device.

Process 600 continues at block 604, where the image is analyzed to identify possible input/output ports on the electronic device. In various embodiments, a possible input/output port may be identified based on shadings or shapes on the electronic device.

Process 600 proceeds to block 606, where the image is analyzed to determine a plurality of non-text characteristics of each possible input/output port on the electronic device. In various embodiments, block 606 implements embodiments of block 408 of FIG. 4 to determine a plurality non-text characteristics of each possible input/output port.

Process 600 continues next at block 608, where the plurality non-text characteristics of the possible input/output ports on the electronic device are compared to non-text characteristics of a plurality of known input/output ports. In various embodiments, a database of known input/output ports and their non-text characteristics may be stored and used to compare with the non-text characteristics of the possible input/output ports.

Process 600 proceeds next to decision block 610, where a determination is made whether there is a match between the non-text characteristics of the possible input/output ports and the non-text characteristics of a known input/output port. If there is a match, process 600 proceeds to block 612; otherwise, process 600 proceeds to block 614.

At block 614, a non-match indicator is provided to the user. In various embodiments, the image of the electronic device may be modified, or have text, labels, logos, symbols, images, or other data overlaid thereon to indicate the ports on the electronic device in the image do not match known ports. A non-match may occur when the image of the electronic device does not show enough non-text characteristics for a positive match with known input/output ports. After block 614, process 600 terminates or returns to a calling process to perform other actions.

If, at decision block 610, there is a match between the non-text characteristics of a possible input/output port on the electronic device and the non-text characteristics of known input/output ports, then process 600 flows from decision block 610 to block 612. At block 612, an indication of the type of ports on the electronic device are provided based on the matched non-text characteristics. In some embodiments, the image of the electronic device is modified to include the indication, such as text, of the type of each identified port. After block 612, process 600 terminates or returns to a calling process to perform other actions.

Similar to process 300, process 600 can utilize still image frames or process 600 may loop from blocks 614 or 612 to block 602 to continually process a plurality of image frames of a video. In this way, a user can utilize their mobile device to display a "live" image of the electronic device, while also overlaying an indicator of the type of ports on the electronic device—thus, providing the user an augmented reality of the electronic device.

Figure 7:
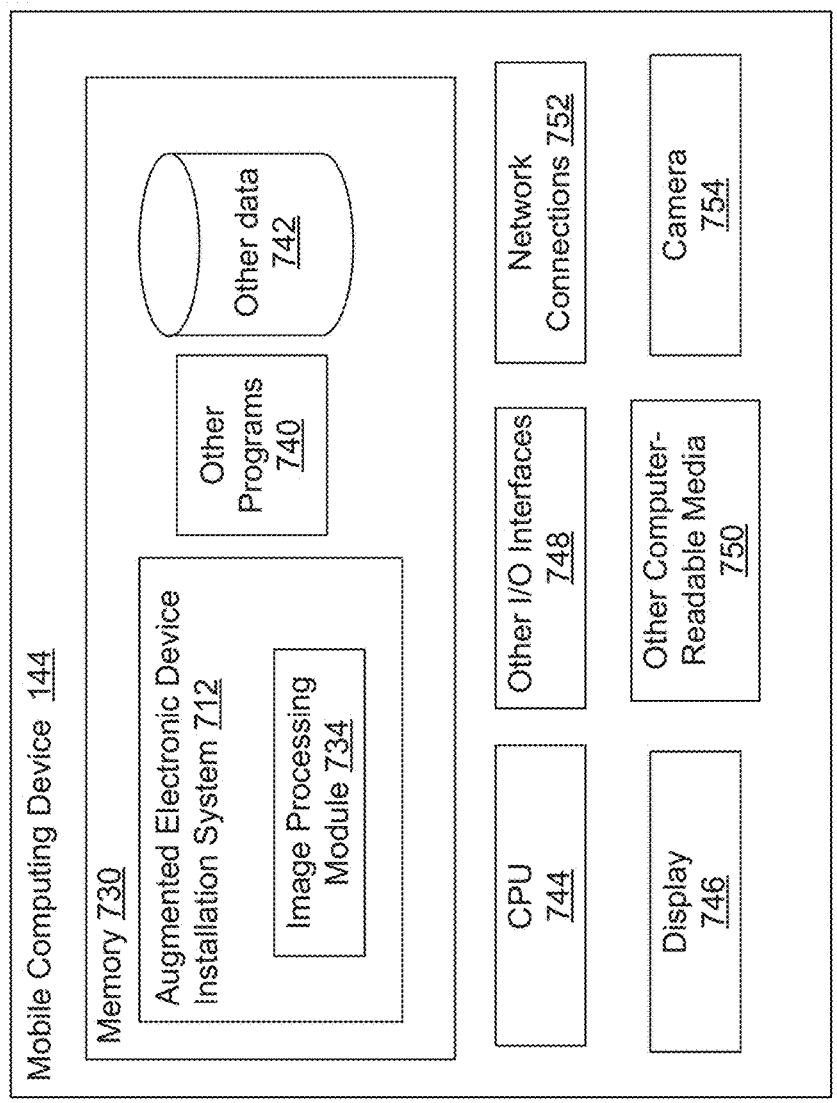
FIG. 7 shows a system diagram that describes one implementation of computing systems for implementing embodiments described herein

FIG. 7 shows a system diagram that describes one implementation of computing systems for implementing embodiments described herein. System 700 includes mobile computing device 144.

Mobile computing device 144 identifies cables and electronic device ports based on non-text characteristics of the cable connectors and the ports. The non-text characteristics are used to identify the type of cable and the type of ports. They are used to determine cables and ports that are compatible with one another, which is used to provide augmented reality in the installation and troubleshooting of electronic devices, as described herein. One or more general-purpose or special-purpose computing systems may be used to implement mobile computing device 144. Accordingly, various embodiments described herein may be implemented in software, hardware, firmware, or in some combination thereof. Mobile computing device 144 includes memory 730, one or more central processing units (CPUs) 744, display 746, other I/O interfaces 748, other computer-readable media 750, network connections 752, and camera 754.

Memory 730 may include one or more various types of non-volatile and/or volatile storage technologies. Examples of memory 730 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 730 may be utilized to store information, including computer-readable instructions that are utilized by CPU 744 to perform actions, including embodiments described herein.

Memory 730 may have stored thereon augmented electronic device installation system 712, which includes image processing module 734. The image processing module 734 may employ embodiments described herein to analyze images to determine cable connectors and matching ports on an electronic device, as described herein. Memory 730 may also store other programs 740 and other data 742. For example, other data 742 may temporarily store images taken by camera 750 and processed by image proceeding module 734. Once it is determined whether the image includes a connector or input/output port, or a match thereof, a modified version of the image is displayed to the user via the display 746. After display, the image may be discarded, deleted, or overwritten with new images or data. In some embodiments, other data 742 may include non-text characteristics of known connectors or input/output ports. In other embodiments, non-text characteristics of known connectors and input/output ports may be stored on a remote computing device (not illustrated). The mobile computing device 144 may utilize the network connection interface 752 to communicate with the remote computing device (not illustrated) via and a network (not illustrated), such as the internet, to access the non-text characteristics of known connectors and input/output ports.

Display 746 is configured to display images taken by camera 750 to a user. Network connections 752 are configured to communicate with other computing devices, via a communication network (not illustrated). Other I/O interfaces 748 may include a keypad, audio interfaces, other video interfaces, or the like. Other computer-readable media 750 may include other types of stationary or removable computer-readable media, such as removable flash drives, external hard drives, or the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method executing on a computing device, comprising:
   receiving an image of an electronic device having a plurality of ports identifiable in the image;
   determining a port type of each corresponding port of the plurality of ports based on a plurality of non-text characteristics of the corresponding port;
   modifying the image to include an indication of each of the plurality of ports with the port type of each corresponding port; and
   presenting the modified image to a user of the computing device.

2. The method of claim 1, wherein modifying the image includes adding or overlaying at least one of text, a label, a logo, a graphic, or a symbol that identifies the port type of each corresponding port.

3. The method of claim 1, wherein modifying the image includes adding or overlaying at least one of text, a label, a logo, a graphic, or a symbol onto the image to show the user a location of each port on the electronic device.

4. The method of claim 1, wherein determining the port type of each corresponding port includes:
   analyzing the image to determine the plurality of non-text characteristics of each corresponding port;
   comparing the plurality of non-text characteristics of each corresponding port with a plurality of non-text characteristics of known ports; and
   identifying the port type based on a match between the plurality of non-text characteristics of the corresponding port and the plurality of non-text characteristics of a known port.

5. The method of claim 1, wherein the plurality of non-text characteristics of each corresponding port include at least one of a color, a size, or a shape of the corresponding port.

6. The method of claim 1, further comprising:
   receiving a second image of at least one electronics cable each having a corresponding connector identifiable in the second image;
   determining a connector type of each corresponding connector based on a plurality of non-text characteristics of the corresponding connector;
   modifying the second image to include an indication the at least one electronics cable with a type of cable based on the connector type of each corresponding connector; and
   presenting the modified second image to the user of the computing device.

7. The method of claim 1, further comprising:
   receiving a second image of an electronic cable having a connector identifiable in the second image;
   determining a connector type of the connector based on a plurality of non-text characteristics of the connector;
   comparing the connector type with the port type of each corresponding port to identify a port on the electronic device that is compatible with the connector on the electronic cable based on a match between the connector type and the port type;
   modifying the second image to illustrate a location of the identified port on the electronic device; and
   presenting the modified second image to the user.

8. The method of claim 1, further comprising:
providing at least one command to the user instructing the user to position a camera on the computing device to capture the image.

9. The method of claim 1, further comprising:
determining that the image does not include an identifiable port on the electronic device;
adjusting a zoom parameter of a camera associated with the computing device; and
re-receiving the image of the electronic device.

10. A method executing on a computing device, comprising:
receiving an image of an electronics cable having a corresponding connector identifiable in the image;
determining a cable type of the electronics cable based on a plurality of non-text characteristics of the corresponding connector;
modifying the image to include an indication of the cable type of the electronics cable; and
presenting the modified image to a user of the computing device.

11. The method of claim 10, wherein modifying the image includes adding or overlaying at least one of text, a label, a logo, a graphic, or a symbol that identifies the cable type.

12. The method of claim 10, wherein determining the cable type of the electronics cable includes:
analyzing the image to determine the plurality of non-text characteristics of the connector;
comparing the plurality of non-text characteristics of the connector with a plurality of non-text characteristics of known connectors; and
identifying the cable type based on a match between the plurality of non-text characteristics of the connector and the plurality of non-text characteristics of a known connector.

13. The method of claim 10, wherein the plurality of non-text characteristics include at least one of a color, a size, or a shape of the connector.

14. The method of claim 10, further comprising:
receiving a second image of an electronic device having a plurality of ports identifiable in the second image;
determining a port type of each corresponding port of the plurality of ports based on a plurality of non-text characteristics of the corresponding port;
modifying the second image to include an indication of each of the plurality of ports with the port type of each corresponding port; and
presenting the modified second image to the user of the computing device.

15. The method of claim 10, further comprising:
receiving a second image of an electronic device having a plurality of ports identifiable in the second image;
determining a port type of each corresponding port of the plurality of ports based on a plurality of non-text characteristics of the corresponding port;
comparing the port type of each corresponding port with the cable type of the electronic cable to identify a port on the electronic device that is compatible with the connector on the electronic cable based on a match between the connector type and the port type;
modifying the second image to illustrate a location of the identified port on the electronic device; and
presenting the modified second image to the user.

16. A mobile computing device, comprising:
a camera that captures images;
a display that displays the images;
a memory that stores instructions and at least temporarily stores the captured images; and
a processor that is configured to execute the instructions to:
receive, via the camera, an image of an electronic device port or a cable connector;
determine a port type or a cable type of the electronic device port or the cable connector based on a plurality of non-text characteristics of the electronic device port or the cable connector;
modify the image to include an indication of the port type or the cable type; and
present, via the display, the modified image to a user of the mobile computing device.

17. The mobile computing device of claim 16, wherein modifying the image includes adding or overlaying at least one of text, a label, a logo, a graphic, or a symbol that identifies the port type or the cable type.

18. The mobile computing device of claim 16, wherein the processor is configured to determine the port type by being configured to execute the computer instructions to:
analyze the image to determine the plurality of non-text characteristics of the electronic device port;
compare the plurality of non-text characteristics of the electronic device port with a plurality of non-text characteristics of known ports; and
identify the port type based on a match between the plurality of non-text characteristics of the electronic device port and the plurality of non-text characteristics of a known port.

19. The mobile computing device of claim 16, wherein the processor is configured to determine the cable type by being configured to execute the computer instructions to:
analyze the image to determine the plurality of non-text characteristics of the cable connector;
compare the plurality of non-text characteristics of the cable connector with a plurality of non-text characteristics of known connectors; and
identify the cable type based on a match between the plurality of non-text characteristics of the connector and the plurality of non-text characteristics of a known connector.

20. The mobile computing device of claim 16, wherein the processor is configured to execute the computer instructions to further:
present, via the display, at least one command to the user instructing the user to position the camera to capture the image.

* * * * *